(12) United States Patent
Nakamura

(10) Patent No.: US 6,901,237 B2
(45) Date of Patent: May 31, 2005

(54) IMAGE READING DEVICE AND IMAGE FORMING APPARATUS

(75) Inventor: Kazuo Nakamura, Kashiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/453,716

(22) Filed: Jun. 4, 2003

(65) Prior Publication Data

US 2003/0227125 A1 Dec. 11, 2003

(30) Foreign Application Priority Data

| Jun. 5, 2002 | (JP) | ................................... 2002-164891 |
| Jun. 5, 2002 | (JP) | ................................... 2002-164895 |
| Jun. 5, 2002 | (JP) | ................................... 2002-164900 |

(51) Int. Cl.[7] ............................................. G03G 15/00
(52) U.S. Cl. ........................ 399/367; 399/363; 399/369; 358/496
(58) Field of Search ............................. 399/377, 363, 399/367, 369; 400/4.01; 358/496

(56) References Cited

U.S. PATENT DOCUMENTS

| 5,385,341 A | * | 1/1995 | Yamada et al. ............ 271/4.01 |
| 5,463,451 A | * | 10/1995 | Acquaviva et al. .......... 399/211 |
| 5,610,731 A | * | 3/1997 | Itoh ............................ 358/496 |
| 5,881,351 A | * | 3/1999 | Shimotoso et al. ......... 399/377 |
| 5,947,464 A | * | 9/1999 | Takada ....................... 271/3.03 |
| 6,188,468 B1 | * | 2/2001 | Miyajima ................... 355/407 |
| 6,721,074 B1 | * | 4/2004 | Kao ............................ 358/496 |

FOREIGN PATENT DOCUMENTS

| JP | 08-34542 | 2/1996 |
| JP | 09-46472 | 2/1997 |
| JP | 11-27444 | 1/1999 |
| JP | 11-32164 | 2/1999 |

* cited by examiner

*Primary Examiner*—Andrew H. Hirshfeld
*Assistant Examiner*—Dave A. Ghatt
(74) *Attorney, Agent, or Firm*—Birch, Stewart, Kolasch & Birch, LLP

(57) ABSTRACT

An image reading device includes a document stacking tray on which documents are stacked, a feed roller for picking up, one sheet at a time, the documents that are stacked on the document stacking tray, a curved transporting path through which the document is transported, and a CCD reading unit and a CIS reading unit for reading images from the document. The document stacking tray includes a electric tray for raising or lowering the document within a range of a height of the curved transporting path, so as to feed the document to the feed roller. With such an arrangement, it is possible to provide an image reading device and an image forming apparatus that are capable of separating and transporting a large number of documents and efficiently reading images from the documents even when the documents are thick.

6 Claims, 13 Drawing Sheets

IMAGE READING DEVICE AND IMAGE FORMING APPARATUS

This nonprovisional application claims priority under 35 U.S.C. § 119(a) on Patent Application No(s). 2002-164891, 2002-164895 and 2002-164900 filed in JAPAN on Jun. 5, 2002, which is(are) herein incorporated by reference.

FIELD OF THE INVENTION

The present invention relates to an image reading device and an image forming apparatus for separating and transporting, one sheet at a time, stacked sheets of document stacked on a document stacking tray, so as to read images from the documents.

BACKGROUND OF THE INVENTION

Conventionally, for the purpose of reading and printing image information of documents using an image reading device having a scanner function, some image forming apparatuses such as a copying machine use an image reading device having an ADF (Auto Document Feeder) that sequentially carries documents, while reading the image information, in printing out the image information.

Here, a basic arrangement of a conventional image reading device having the ADF is described below.

For example, as shown in FIG. 9, an image reading device 100 includes a document stacking tray 101, feed rollers 102, a curved transporting path 103, a CCD (Charge Coupled Device) reading unit 104, a CIS (Contact Image Sensor) 105, and an ejection tray 106. The image reading device 100 also includes plural pairs of rollers that carry documents.

The document stacking tray 101 is provided to stack sheets of document (not shown). The feed rollers 102 pick up a document, one at a time, from the stack of documents on the document stacking tray 101, and feed the document to the curved transporting path 103. The curved transporting path 103 is provided so that a transporting path for the documents from the document stacking tray 101 to the ejection tray 106 can be made compact. The curved transporting path 103 has plural pairs of rollers that carry documents.

The CCD reading unit 104 and the CIS 105 read images from the documents.

The CCD reading unit 104 includes an optical unit 107 and a CCD 108. At a reading position C1, the CCD reading unit 104 scales down, using the optical unit 107, an image on the document being transported, and focuses the resultant image on the CCD 108, so as to read the image on one side of the document.

The CIS 105 reads, at a reading position D, an image on the other side of the document being transported, using a linear CCD (not shown) that is substantially equal in width to the transporting path for the documents (slightly wider than a widest possible width of the documents).

The CCD reading unit 104 is also capable of reading, by moving the optical unit 107 to reading positions C1 through C3, an image on a document in a stationary state.

The ejection tray 106 is provided to eject and stack the documents which have been transported and finished with image reading.

With the arrangement above, the image reading device 100 operates as follows.

First, the feed rollers 102 pick up a document from the stack of documents on the document stacking tray 101 one at a time, so as to feed it to the curved transporting path 103. In the curved transporting path 103, the CCD reading unit 104 and/or the CIS 105 read images from the document being transported by the pairs of rollers. It is when double-sided printing is performed that the document is read by the CCD reading unit 104 and the CIS 105. After the images on the document have been read, the document is transported to a document ejecting point 109, and is stacked on the ejecting tray 106.

Referring to publications, the following describes conventional image reading devices that have a basic arrangement similar to that of the image reading device 100 described above.

First, a more specific example of a conventional image reading device is, for example, an auto document feeder for reading documents, disclosed in Japanese Publication for Unexamined Patent Application No. 46472/1997 (Tokukaihei 9-46472; publication date: Feb. 14, 1997).

As shown in FIG. 10, the auto document feeder 200 includes a document stacking tray (stacking tray) 201, a feed roller 202, a curved transporting path (reverse transporting path) 203, a first reading unit 204, a second reading unit 205, a transparent board 206, an ejection tray 207, a transparent document table 208, and a slide bar 209.

In the following, members that have similar functions to those described in the above schematic arrangement are labeled with the same referential numerals, and explanations thereof are omitted here.

The first and second reading units 204 and 205 in the arrangement above are respectively provided to read two sides of each document P being transported. On the transparent board 206, the first reading unit 204 reads the document P being transported.

The transparent document table 208 is not used for reading the document P being transported, but for reading a document, such as an opened book, in a stationary state. The slide bar 209 moves the first reading unit 204 along itself in order to read the stationary document on the transparent document table 208.

In this arrangement, the automatic document transporting device 200 feeds the document P stacked on the document stacking tray 201 to the curved transporting path 203 one at a time, using the feed roller 202. In the curved transporting path 203, the document P so fed is transported along the path. Then, the second reading unit 205 provided on the curved transporting path 203 reads one side of the document P.

Then, on the transparent board 206, the first reading unit 204 reads the other side of the document P that has been fed from the curved transporting path 203. Here, the first reading unit 204 does not move (but is in a stationary state) in reading the document P. Finished with image reading, the document P is ejected to the ejecting tray 207.

With the operations above, plural sheets of document P can be sequentially read while being transported, without being stopped.

In this arrangement, the first reading unit 204 is movable using the slide bar 209. Thus, by moving the first reading unit 204 along the slide bar 209, the document P placed on the transparent document table 208 can be read. As a result, it is possible to manually set and read a page of a book, for example, which cannot be transported.

In this arrangement, the second reading unit 205 is provided midway through the curved transporting path 203, and the first reading unit 204 reads one side of the document not read by the second reading unit. This makes it possible to read both sides of each document by transporting the document only once.

Another specific example of a conventional image reading device is disclosed in Japanese Publication for Unexamined Patent Application No. 32164/1999 (Tokukaihei 11-32164; publication date: Feb. 2, 1999).

As shown in FIG. 11, the image reading device 300 includes a document stacking tray (document tray) 301, a feed roller (pickup roller) 302, a curved transporting path (guide board) 303, first reading means 304, second reading means 305, and an ejection tray (document ejection tray) 306.

In this arrangement, the first reading means 304 and the second reading means 305 are provided for respectively reading two sides of a document being transported.

The first reading means 304, at a reading position E, reads an image of a document being transported, using a CCD 308 through an optical unit 307.

In this arrangement, the image reading device 300, using the feed roller 302, feeds a document P stacked on the document stacking tray 301 to the curved transporting path 303, one at a time. In the curved transporting path 303, the document P is transported along a predetermined path.

Then, the first reading means 304 reads, at a reading position E, one side of the document P that has been fed from the curved transporting path 303 using a transporting roller 309. In so doing, the first reading means 304 reads the document P being transported, without moving the optical unit 307 from the reading position E.

Then, the second reading means 305 reads the other side of the document P being transported, and ejects the document P to the ejection tray 306.

In this manner, plural sheets of document P can be sequentially read while being transported and without being stopped. Moreover, both sides of the document P can be read by the first reading means 304 and the second reading means 305.

In this arrangement, in a case where the document is placed on the glass document table 310, the optical unit 307 is moved with respect to the document (not shown) placed on the glass document table 310, so as to read an image.

Yet another specific example of a conventional image reading device is a document reading device disclosed in Japanese Publication for Unexamined Patent Application No. 27444/1999 (Tokukaihei 11-27444; publication date: Jan. 29, 1999). With reference to FIG. 12, an arrangement of a copying device 400 having the document reading device 410 is described below.

As shown in FIG. 12, the document reading device 410 has a document stacking tray (document stacking table) 401, a separating section 402, a book scanner section 405, a CIS (Contact Image Sensor) 406, and an ejection tray (document ejection tray) 407.

The copying device 400 has a recording section 408 for printing out information read by the document reading device 410.

The separating section 402 includes a separating pad 403 and a separating roller 404. As with the feed roller of the conventional example above, the separating pad 403 and the separating roller 404 are capable of picking up, one sheet at a time, sheets of document P stacked on the document stacking tray 401. In this arrangement, the document P is transported by the separating roller 404, instead of the curved transporting path used in the foregoing conventional example.

The document P that has been transported is read by the book scanner section 405 and the CIS 406. One side of the document P is read at the book scanner section 405, and the other side of the document is read at the CIS 406. Then, the document P that has been read and finished with image reading is ejected to the ejection tray 407.

In this manner, plural sheets of document P can be sequentially read while being transported and without being stopped. Moreover, both sides of each document P can be read by the book scanner section 405 and the CIS 406.

A further specific example of the conventional image reading device is a document transporting device of an image reading device disclosed in Japanese Publication for Unexamined Patent Application No. 34542/1996 (Tokukaihei 8-34542; publication date: Feb. 6, 1996).

As shown in FIG. 13, the document transporting device 500 includes a document stacking tray (document tray) 501, a feed roller (pickup roller) 502, a curved transporting path (document transporting path) 503, a registration roller device 504, a platen roller 505, a platen 506, a scanning device 507, a CCD 508, and an ejection tray 509.

Here, the registration roller device 504 adjusts a position of a front end of the document P being transported, and sends the document P to a reading position at a predetermined timing. The platen roller 505 and the platen 506 transport the document P at the reading position.

In this arrangement, the document transporting device 500, using the feed roller 502, feeds the documents P stacked on the document stacking tray 501 to the curved transporting path 503, one at a time. In the curved transporting path 503, the document P is transported along the path. Then, the front end position of the document P is adjusted by the registration roller device 504, and the document P is sent between the platen roller 505 and the platen 506. In this manner, a reading timing of the document can be adjusted. It is also possible to adjust, for example, an angle of the document P, if the document P is transported on an angle.

Between the platen roller 505 and the platen 506, the document P being transported is read with the CCD 508 via a mirror or the like, which is shown as the scanning device 507. Finished with the image reading, the document P is ejected to the ejection tray 509.

As described above, the document transporting device 500 has such an arrangement in which the front end position of the document P is adjusted by the registration roller device 504, and the document P is transported to the reading position at a predetermined timing. As a result, it is possible to adjust, for example, an angle of the document by adjusting the reading timing, if the document is transported on an angle.

With the foregoing conventional image reading devices and image forming apparatuses, however, there is a problem that a large number of documents cannot be handled, and a thick sheet of document cannot be read appropriately.

Recently, printers and the like having the image reading device have been used in a wider range of applications than before. For example, unlike conventionally, there is a need for handling thick sheets of document. There is also a need for reading larger volume of document in a shorter time, so as to accommodate an increasing amount of information than before.

However, the above arrangements are associated with certain potential problems, as described below.

First, the auto document feeder described in Tokukaihei 9-46472 shown in FIG. 10 is so arranged that the documents P stacked on the document stacking tray 201 are transported by the feed roller 202.

In this arrangement, when a large number of documents P are handled, the height of the stacked documents P on the document stacking tray 201 is gradually lowered as the documents P are sequentially transported. This may cause a problem in picking up the document P with the feed roller 202.

The document stacking tray 201 is provided immediately above the ejection tray 207, covering the ejection tray 207 substantially completely. It is therefore necessary, when handling a large number of documents P, to provide enough space between the document stacking tray 201 and the feed roller 202, and between the ejection tray 207 and the document ejecting point 210, so as to accommodate a large number of documents P or thick sheets of documents P. This increases the height of the auto document feeder 200.

In Tokukaihei 11-32164, shown in FIG. 11, in which the image reading device 300 is described, the publication does not describe any arrangement for ensuring stable supply of documents P in regard to the document stacking tray 301 when handling a large number of documents P or thick sheets of documents P.

In the document reading device 400 described in Tokukaihei 11-27444, shown in FIG. 12, the document stacking tray 401 is provided immediately above the ejection tray 407, covering the ejection tray 407 substantially completely. It is therefore necessary, when handling a large number of documents P, to provide enough space between the document stacking tray 401 and the separating pad 403, and between ejection tray 407 and the document ejecting point 409, so as to accommodate a large number of documents P or thick sheets of documents P. This increases the height of the document reading device 410.

Furthermore, as shown in FIG. 12, the distance between the document stacking tray 401 and the ejection tray 407 depends on a diameter of the separating roller 404. Accordingly, it is necessary to increase the diameter of the separating roller 404 in order to handle a large number of documents P. This might result in great increase in cost of manufacturing, maintaining, and using (in which power is consumed by the rotation) the separating roller 404.

In the document transporting device 500 described in Tokukaihei8-34542, shown in FIG. 13, the height of documents P stacked on the document stacking tray 501 is gradually lowered as the documents P are sequentially transported. This may cause a problem in picking up a document P by the feed roller 502.

Furthermore, as shown in FIG. 13, the document stacking tray 501 is provided over the ejection tray 509. It is therefore necessary, when handling a large number of documents P, to increase the height of the document transporting device 500, so that the documents P can be stacked thereon.

SUMMARY OF THE INVENTION

The object of the present invention is to provide an image reading device and an image forming apparatus that are capable of separating and transporting a large number of documents and efficiently reading images therefrom even when the documents are thick.

To solve the problems above, an image reading device of the present invention includes: document stacking section for stacking a document; document feeding section for picking up, one sheet at a time, the document stacked on the document placing section; a curved transporting path through which the document picked up by the document feeding section is transported; and image reading section for reading an image from the document, the document stacking section including document lifting and lowering section for lifting or lowering the document stacked on the document stacking section within a range of a height of the curved transporting path, so as to feed the document to the document feeding section.

In this invention, the document stacking section includes the document lifting and lowering section capable of lifting or lowering the document, so that the document can be lifted or lowered when feeding the document to the document feeding section. This enables the document to be suitably fed to the document feeding section by suitably lifting the document lifting and lowering section, even when a large number of documents or thick documents are stacked on the document stacking section.

In the present invention, the document lifting and lowering section lifts or lowers the document within the height of the curved transporting path. Therefore, the presence of the document lifting and lowering section does not increase the height of a main body of the image reading device.

Moreover, even when the curvature of the document in the curved transporting path is decreased by increasing the height of the main body of the image reading device for example, it is possible to keep the main body of the image reading device compact because the document lifting and lowering section can raise or lower the document without adding to the height of the main body of the image reading device. Therefore, by decreasing the curvature of the document in the curved transporting path for example, it is possible to stably transport the document even when the document is thick.

As a result, it is possible to provide an image reading device capable of separating and transporting a large number of documents and efficiently reading images therefrom even when the documents are thick.

Moreover, to solve the problems above, an image reading device of the present invention includes: document stacking section for stacking a document; document feeding section for picking up, one sheet at a time, the document stacked on the document stacking section; a curved transporting path through which the document picked up by the document feeding section is transported; and image reading section for reading an image from the document, said image reading device further including: a planar correction region, provided between the curved transporting path and the image reading section, where correction of the document is performed to adjust a transported state of the document.

In this invention, the image reading device guides the document to the image reading section after the document that has been transported through the curved transporting path passes through the correction region.

In this way, by causing the document to pass through the correction region before the document is read, it is possible to stabilize the transported state of the document, which may have become unstable on its way through the curved transporting path. Image reading is thus ensured by stabilizing the transported state of the document when reading the image.

Moreover, because the correction region is a plane surface, it is possible to correct the transported state of the document within the plane surface.

As a result, it is possible to provide an image reading device capable of separating and transporting a large number of documents and efficiently reading images therefrom even when the documents are thick.

To solve the problems above, an image reading device of the present invention includes: document stacking section for stacking a document; document feeding section for picking up, one sheet at a time, the document stacked on the document placing section; a curved transporting path through which the document picked up by the document feeding section is transported; image reading section for reading an image from the document; and registration section for performing registration on the document that has been transported via the curved transporting path, the image reading section including: charge coupled device reading section for reading one side of the document that has been transported via the registration section; and contact image sensor reading section for reading the other side of the document that has been read by the charge coupled device reading section, the charge coupled device reading section having a depth of focus whose compensation range is wider than that of the contact image sensor reading section.

In this invention, the image reading section includes the CCD reading section for reading one side of the document that has been transported via the registration section, and the CIS reading section for reading the other side of the document that has been read by the CCD reading section. The image reading device guides the document from the curved transporting path via the registration section to the image reading section. Then, the image reading section reads the document by the CCD reading section and the CIS reading section in this order.

Here, the registration section is provided to perform skew correction on the document being transported, and to adjust a timing of sending the front end of the document. Therefore, the images on the both sides of the document can be read after the transported state of the document has been stabilized by the front end adjustment and the skew correction of the registration section.

In this invention, the CCD reading section has a depth of focus whose compensation range is wider than that of the CIS reading section. Therefore, in order to read images, the CCD reading section, whose depth of focus has a wider compensation range than that of the CIS reading section, is disposed before the CIS reading section. Here, the term "depth of focus" refers to a range in which a clear image can be obtained in front of and behind the focal plane.

When sending the document to the reading position of the image reading section, the extent to which the document being transported will be bent depends on the thickness of the document. Specifically, the document will not be bent at a position distanced from the registration section because the document is free. On the other hand, on a halfway point from the registration section, the extent to which the document will be bent depends on the thickness of the document.

More specifically, when sending the document to the reading position on a horizontal surface from the registration section which is disposed diagonally above for example, the document will contact the horizontal surface at a distant position from the registration section and will not be bent. On the other hand, on a halfway point from the registration section, i.e., between the registration section and the reading position, the document will be bent (warped) to the extent that is determined by the thickness of the document, and a spacing is created between the document and the horizontal surface. The thicker the document, the larger is the spacing at the halfway point.

To overcome this drawback, in the present invention, the CCD reading section, whose depth of focus has a wider compensation range than that of the CIS reading section, is disposed closer to the registration section where the document is bent to a greater extent, and the CIS reading section, having the narrower depth of focus, is disposed farther from the registration section where the document is bent to a lesser extent. As a result, the document can be read without fail at the both reading positions.

This guarantees that the document is stably transported and is read without fail. This ensures that the document is read even when a large number of documents needs to be successively read or the documents are thick.

As a result, it is possible to provide an image reading device capable of separating and transporting a large number of documents and efficiently reading images therefrom even when the documents are thick.

To solve the problems above, an image forming apparatus of the present invention includes the image reading device.

Therefore, it is possible to read and print a large number of documents of various kinds.

As a result, it is possible to provide an image forming apparatus capable of separating and transporting a large number of documents and efficiently reading images therefrom even when the documents are thick.

For a fuller understanding of the nature and advantages of the invention, reference should be made to the ensuing detailed description taken in conjunction with the accompanying drawings.

DESCRIPTION OF THE EMBODIMENTS

Referring to FIGS. 1 to 8, the following describes an embodiment of the present invention.

An image reading device of the present embodiment is provided in an image forming apparatus, for example, such as a digital copying machine, and it is provided to separate and transport plural sheets of document one at a time, so as to read images from the documents.

Figure 1:
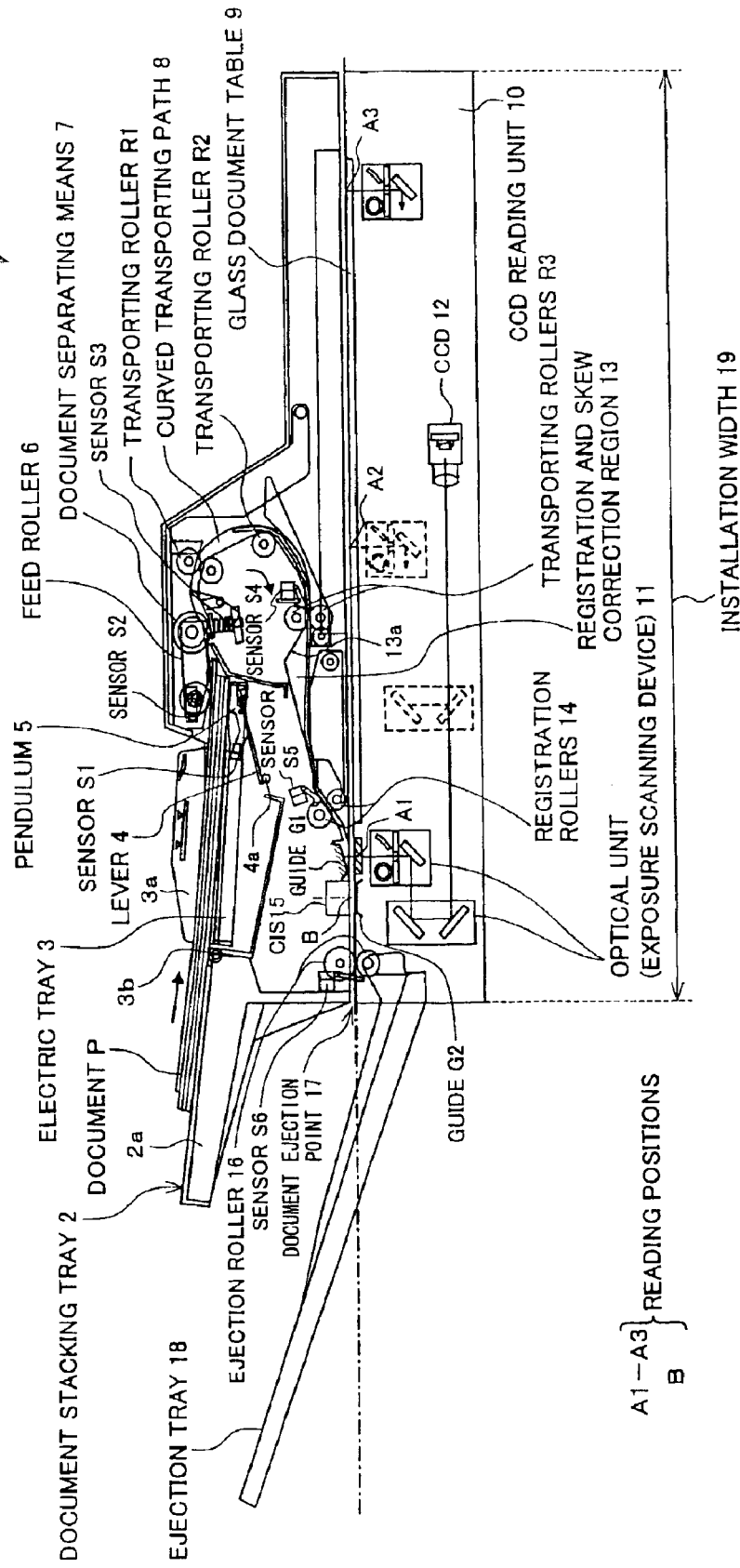
FIG. 1 is a block diagram illustrating an arrangement of an image reading device in one embodiment of the present invention.

As shown in FIG. 1, an image reading device 1 has a document stacking tray (document stacking means) 2, a feed roller (document feeding means) 6, document separating means 7, a curved transporting path 8, a glass document table 9, a CCD (Charge Coupled Device) reading unit (image reading means) 10, a registration and skew correction region 13, a registration roller (registration means) 14, a CIS (Contact Image Sensor) reading unit (image reading means) 15, an ejection roller (ejection means) 16, and an ejection tray (ejected document stacking means) 18.

The document stacking tray 2 is provided to stack documents P. The document stacking tray includes a stacking tray anchoring section 2a, which is anchored to cantilever from the image reading device 1, and an electric tray 3, provided as an extension of the stacking tray fixing section 2a, capable of moving up and down freely. In the present embodiment, the electric tray 3 is provided specifically for smoothly feeding document P to the feed roller 6. In FIG. 1, shown above the electric tray 3 are lateral guide walls 3a vertically provided on the both ends of the electric tray 3 on the posterior side of the image reading device 1.

The electric tray 3 is rotatably provided on a hinge section 3 at an end of the stacking tray fixing section 2a. Below a free end of the electric tray 3 is a lever 4, rotatably provided on a lever shaft 4a, for supporting a bottom of the free end of the electric tray 3. The lever shaft 4a extends toward the posterior side of the image reading device 1, and is rotatably connected via a transmitting member, such as a gear, to a motor (not shown) provided on the posterior of the image reading device 1. In this way, driving the motor rotates the lever shaft 4a to cause the lever 4, attached to the lever shaft 4a, to rotate on the lever shaft 4a, so that an end of the lever 4, in contact with the electric tray 3, lifts the electric tray 3 from below. As a result, the electric tray 3 moves up by rotating on the hinge section 3b. When the lever 4 is rotated in reverse direction, the electric tray 3 moves down.

Moreover, the electric tray 3 also has a pendulum 5 and a sensor S1. When a document P is placed on the document stacking tray 2, the pendulum 5 and the sensor S1 cause the lever 4 to lift the electric tray 3 transporting the document P, so that the document P can be to smoothly fed to the feed roller 6. Therefore, the electric tray 3 and the lever 4 function as document lifting means of the present invention. Details of the lifting operation of the electric tray 3, including an operation of the pendulum 5, are described later.

The feed roller 6 is provided to pick up, one sheet at a time, the document P placed on the document stacking tray 2, and supply the document P to the curved transporting path 8. The document separating means 7 ensures that the document P fed from the feed roller 6 is properly sent to the curved transporting path 8 one at a time.

The curved transporting path 8 is provided so that the path for the document P from the document stacking tray 2 to the ejection tray 18 can be made compact. The curved transporting path 8 has transporting rollers R1 to R3 for transporting the document P.

Figure 9:
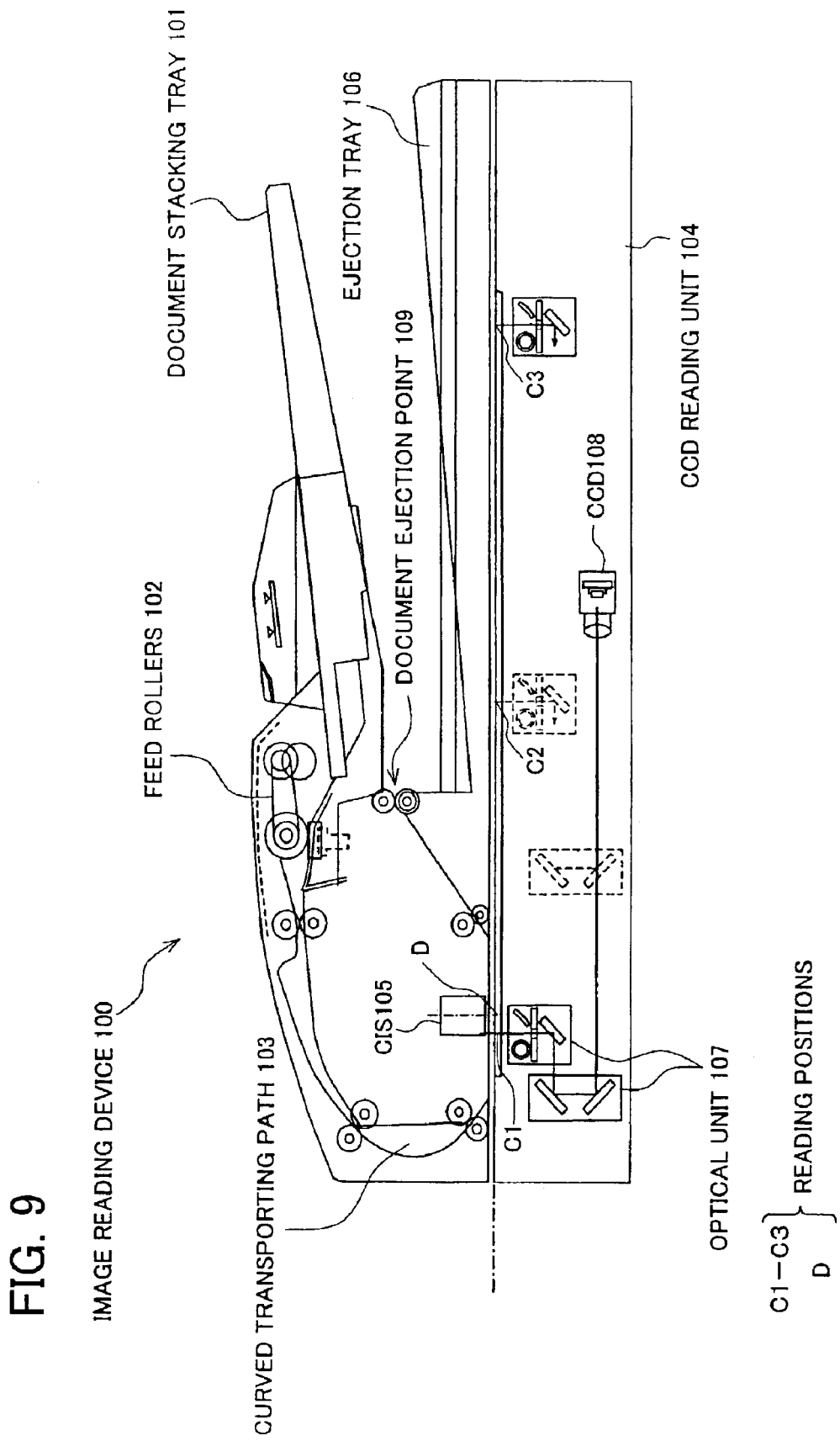
FIG. 9 is a block diagram illustrating a basic arrangement of a conventional image reading device.

The curved transporting path 8 of the present embodiment is so formed that a portion of the curved transporting path 8 from the transporting roller R1 to the transporting roller R3 has a uniform curvature. Further, as shown in FIG. 1, the curved transporting path 8 of the present embodiment is provided inward within a range of an installation width 19 of the image reading device 1. Specifically, in the image reading device 1 of the present embodiment, the document stacking tray 2 is externally provided to the image reading device 1, and the curved transporting path 8 is curved toward the center of the image reading device 1. In this respect, the image reading device 1 of the present embodiment is different from the image reading device 100, the auto document feeder 200, or the image reading device 300, shown in FIGS. 9 to 11, which were described in connection with the BACKGROUND OF THE INVENTION section.

The transporting rollers R1 and R2 carry the document P through the curved transporting path 8. The transporting roller 3 sends the document P fed via the curved transporting path 8 to the registration and skew correction region 13 so as to perform registration and skew correction in cooperation with the registration roller 14.

The registration and skew correction region 13 is an area between the transporting rollers R3 and the registration roller 14 where registration and skew correction of the document P is performed. The registration roller 14 stops the document P by capturing a front end of the document P that was sent out through the registration and skew correction region 13 from the transporting rollers R3, and sends the document P to reading positions A1 and B at a predetermined timing.

The glass document table 9 is used to read an image of a document, for example, such as a book, (not shown) that is placed on the glass document table 9, using the CCD reading unit 10. The CCD reading unit 10 and the CIS reading unit 15 function as image reading means for reading document P.

The CCD reading unit 10 is realized by an optical unit (exposure scanning device) 11 and a CCD (Charge Coupled Device) 12. The CCD reading unit 10 scales down, using the optical unit 11, an image of the document P at the reading position A1, and focuses the resultant images on the CCD 12, so as to read the image on one side of the document P. In this case, the CCD reading unit 10 reads the document P being transported, without moving the optical unit 11 from the reading position A1.

The CCD reading unit 10 is also capable of reading a document P placed on the glass document table 9, by moving the optical unit 11 from the reading position A1 to the reading positions A2 and A3. It should be noted here that the reading position A2 is merely a transient reading point of the optical unit 11. That is, the reading position A1 is used as a home position in a standby state, and, in exposing and scanning the document P placed on the glass document table 9, the scanning is performed within the range between the reading position A1 and the reading position A3. Further, the range of scanning is not necessarily restricted to the entire range between the reading position A1 and the reading position A3, but the range may be decided in relation to document size, recording size, magnification, and the like.

Meanwhile, the CIS reading unit 15, at the reading position B, reads an images on the other side of the document P being transported, using a linear CCD (not shown), which is substantially equal in width to a transporting path for the document P (slightly wider than a widest possible width of the document).

In the present embodiment, the reading position B of the CIS reading unit 15 is located outside of the region where the reading positions A1 to A3 of the CCD reading unit 10 are provided. With this arrangement, it is possible to shorten the moving distance of the optical unit 11 in reading the document (not shown) placed on the glass document table 9, compared with the case where, for example, the reading position B of the CIS reading unit 15 is located inside the region where the reading positions A1 to A3 of the CCD reading unit 10 are provided.

The ejection roller 16 ejects the document P onto the ejection tray 18. The ejection tray 18 is provided to stack the ejected document P that has been transported and finished with the image reading.

The following describes operations of the image reading device 1 of the foregoing arrangement for reading document P.

First, with reference to FIGS. 2 to 4, the operations will be described based on the case where documents P are stacked on the document stacking tray 2.

Figure 2:
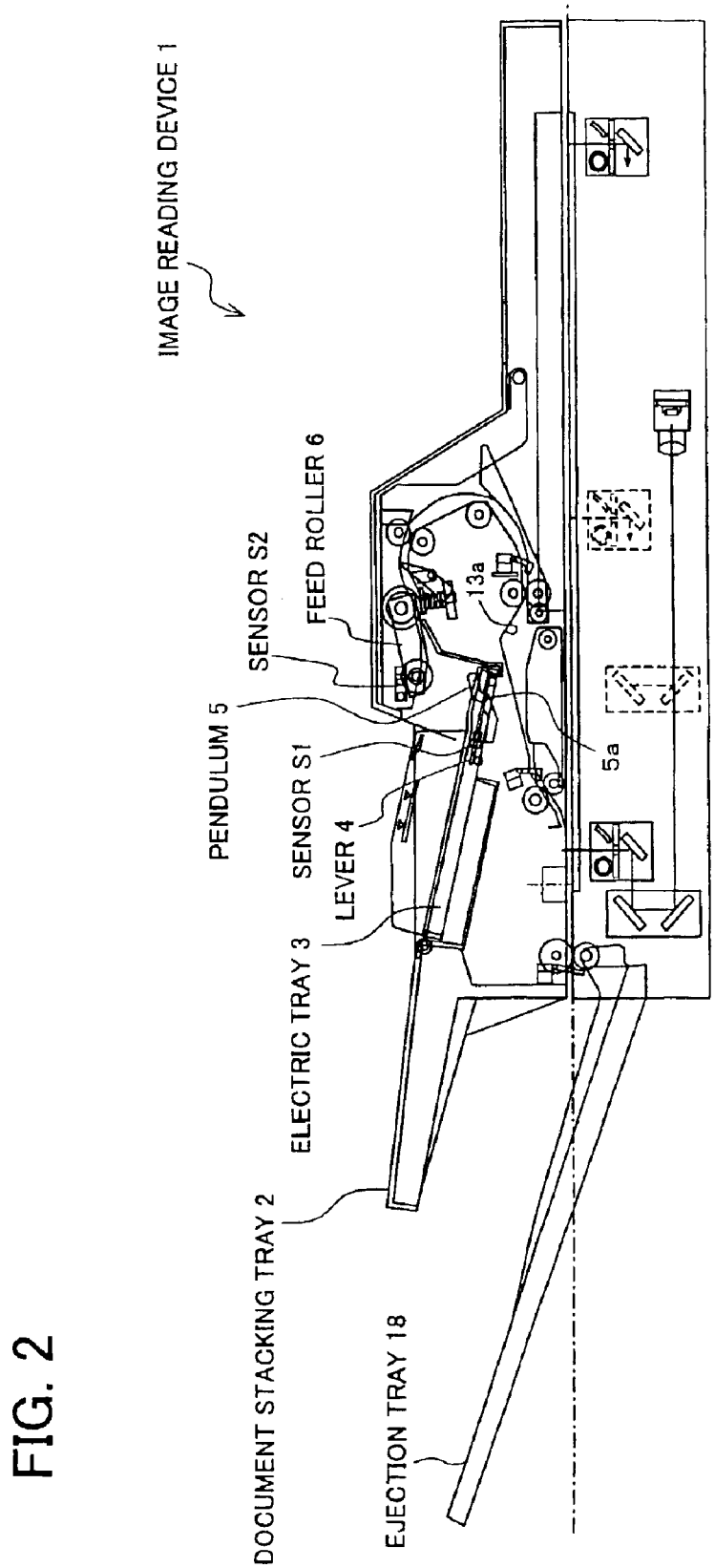
FIG. 2 is a block diagram illustrating a state of the image reading device in which no document is stacked on a document stacking tray.
Figure 3:
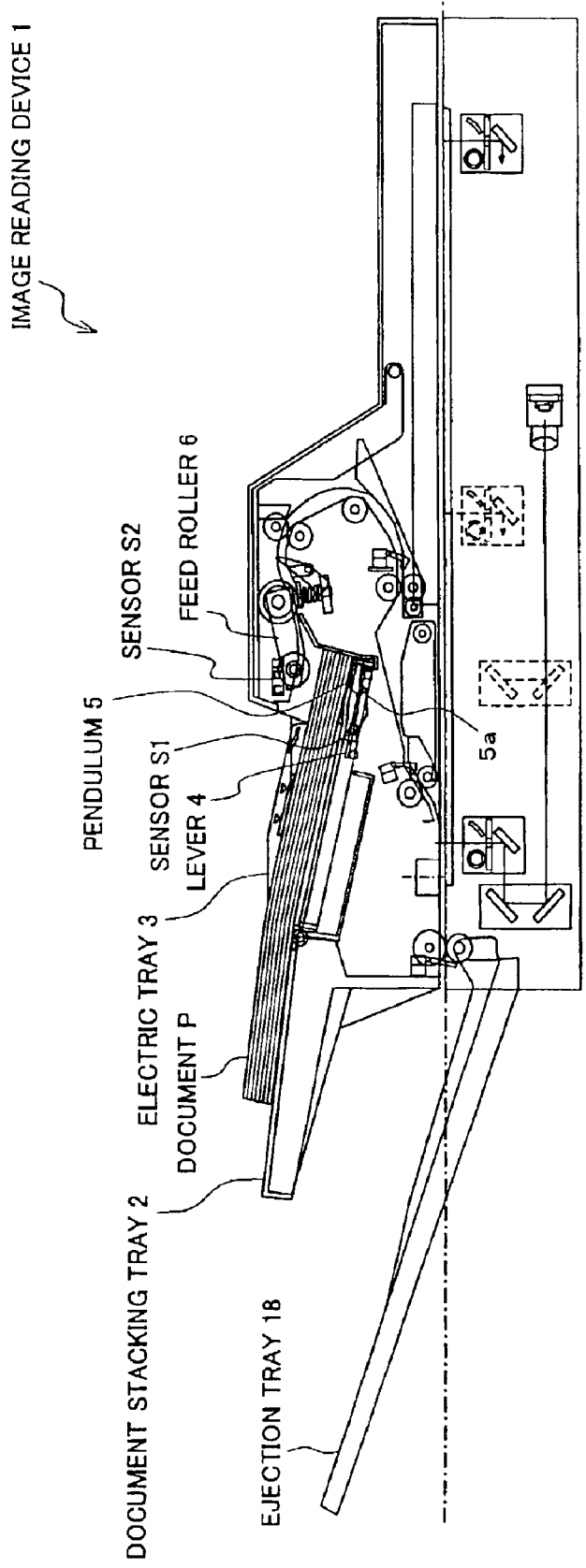
FIG. 3 is a block diagram illustrating a state of the image reading device in which documents are stacked on the document stacking tray, and the electric tray is lowered by the weight of the documents.

As shown in FIG. 2, when no document is placed on the document stacking tray 2, an end of the pendulum 5 appears above a surface of the electric tray 3 on which documents are to be stacked. The pendulum 5 is rotatably supported by the electric tray 3 on a rotational axis 5a, so as to be capable of freely swinging like a see-saw. The length of one arm (a portion on one side of the rotational axis 5a) of the pendulum 5 and the length of the other arm (a portion on the other side of the rotational axis 5a) of the pendulum 5 are different. Accordingly, when no document P is placed on the electric tray 3, the shorter arm of the pendulum 5 appears above the surface of the electric tray 3 on which documents P are to be stacked. When documents P are stacked on the document stacking tray 2, as shown in FIG. 3, the end of the pendulum 5 that has been appearing above the surface of the electric tray 3 is pushed down below the surface of the electric tray 3. In response, the pendulum 5 rotates on the rotational axis 5a, and the other end of the pendulum 5 contacts the sensor S1, upon which the rotation of the pendulum 5 is detected. In this manner, it is judged that documents P are stacked on the document stacking tray 2.

Figure 4:
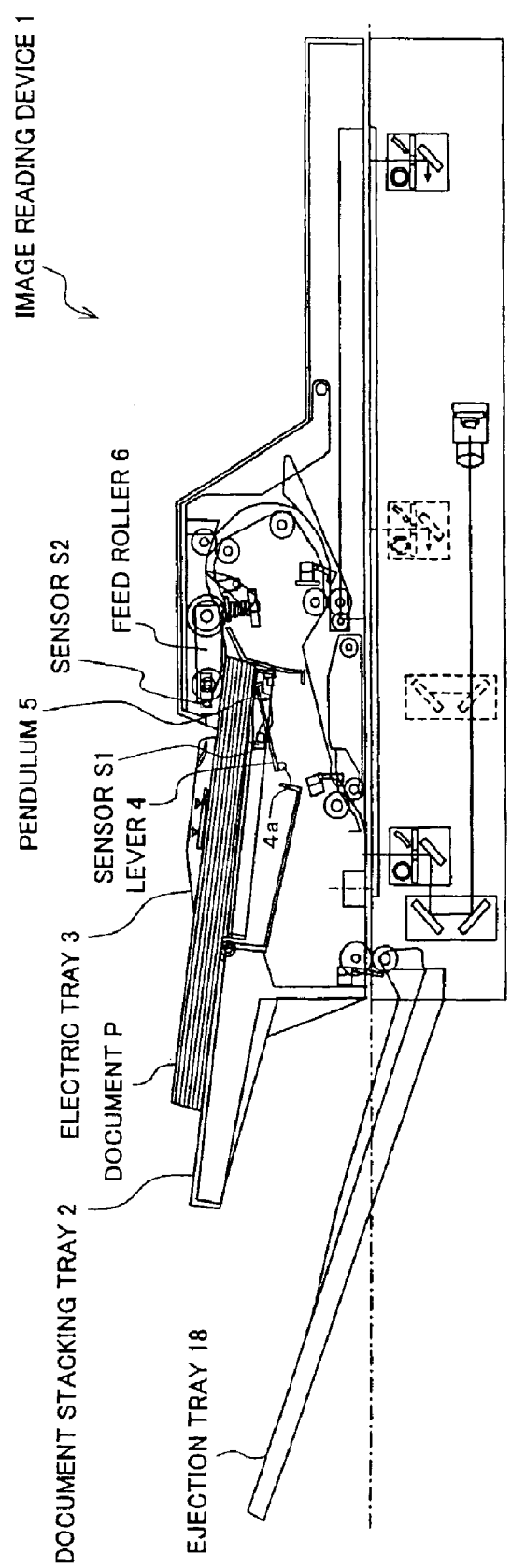
FIG. 4 is a block diagram illustrating a state of the image reading device in which the electric tray, which was lowered by the weight of the documents stacked on the document stacking tray, is raised with a lever.

As a result, as shown in FIG. 4, the lever 4 rotates counterclockwise on the lever shaft 4a at a predetermined timing. By the rotation, an end of the lever 4 lifts the bottom of the electric tray 3, causing the electric tray 3 to rotate and move up. The electric tray 3 is stopped at such a position that the surface of the uppermost sheet in the stack of documents P stacked on the document stacking tray 2 contacts the feed roller 6, so that the document P can be smoothly fed to the feed roller 6. Specifically, the electric tray 3 is stopped when the sensor S2 provided on the feed roller 6 detects a predetermined pressure applied to the feed roller 6 by the surface of the uppermost document P. The electric tray 3 is lifted in this manner to bring the document P into contact with the feed roller 6. As a result, the documents P are always kept parallel to the feed roller 6.

Turning back to FIG. 1, when a signal for starting reading the documents P is supplied from a switch (not shown), the feed roller 6 starts rotating, and sequentially feeds the documents P one at a time to the curved transporting path 8.

When the signal for starting reading the documents P is not supplied within a predetermined time period after the electric tray 3 has been lifted and has moved up and has stopped at a predetermined position, the electric tray 3 moves down to a predetermined level.

The document separating means 7 ensures that the document P sent out from the feed roller 6 has been separated into an individual sheet, and sends the document P to the curved transporting path 8. The provision of the document separating means 7 ensures that only the uppermost sheet of the document stacked on the document stacking tray 2 is sent out, even when the feed roller 6 feeds plural sheets of document.

The document P separated by the document separating means 7 is detected by the sensor S3 upon arrival. Then, the document P is transported into the curved transporting path 8.

The curved transporting path 8 is so designed that a curvature of the document P being transported falls within a predetermined range, so as to be able to stably transport such types of documents P that are usually set on the document stacking tray 2 and are guaranteed by a manufacturer of the image reading device. Therefore, even when the document P is thick and firm for example, the curved transporting path 8 is capable of transporting the document P without trouble, owing to the small curvature.

Further, in the curved transporting path 8, the document P is transported by a transporting roller R2, which is a driven roller. In the vicinity of an exit of the curved transporting path 8, a sensor S4 detects a state of the document P passing through the curved transporting path 8, so as to ascertain whether or not the document P has been transported properly. Then, the document P is transported by the transporting rollers R3 to the registration and skew correction region 13.

When the front end of the document P passes the registration and skew correction region 13 and when the front end is detected by a sensor S5, which is located upstream to the registration rollers 14, the transporting roller 3 pushes the document P further while the registration rollers 14 remain stationary. In this manner, the registration and the skew correction are performed in the registration and skew correction region 13 for a predetermined period of time.

The registration and skew correction region 13 is so designed that the document P is substantially squared between the transporting rollers R3 and the registration rollers 14 when the registration and the skew correction are performed. Specifically, guide plates are respectively provided above and below the registration and skew correction region 13. The upper guide plate 13a has a cross-section of a reverse-V-shape, creating a spacing above the curved transporting path 8.

Therefore, even when a thick and firm sheet of document P is transported for example, the document P can bend in the spacing. This enables the document P after the registration to maintain its state of correction during standby, thereby performing the registration and skew correction without fail.

Specifically, with the front end of the document P reaching a nip portion of the registration roller 14 that has stopped rotating, the transporting rollers R3 provided upstream to the registration rollers 14 (at the exit of the curved transporting path 8) continue to carry the document P. The transporting rollers R3 are a pair of rollers, a driven roller of which being pressed against a driving roller. By pushing forward the document P whose front end is restricted by the registration rollers 14, the transporting rollers R3 correct any skew in the document P by squaring the document P. More specifically, the driven roller of the transporting rollers R3 is pressed against the driving roller with such a pressure that the document P is pushed when it has been transported properly, whereas the document P slips when the document P has been transported with a skew and needs to be. corrected. In the present embodiment, after the skew correction of the document P is performed, the document P is bent between the registration roller 14 and the transporting rollers R3 (that is, in the registration and skew correction region) during standby, so as to maintain the corrected state of the document P. In other words, the front end of the document P is in contact with the nip of the registration rollers 14 until the document P starts being transported again, so that the document P remains properly aligned once the front end of the document P is adjusted and the skew is corrected.

A length of the registration and skew correction region 13 in the direction of travel of the document P (that is, a distance between the transporting rollers R3 and the registration rollers 14) is decided taking into account a smallest possible size of documents P that can be used in the image reading device 1 of the present embodiment. Thus, the distance between the transporting rollers R3 and the registration roller 14 is shorter than the length of a smallest document. This ensures that even a document P of a smallest size can be transported without fail. However, the present invention is not limited to this arrangement. The distance between the transporting rollers R3 and the registration rollers 14 may be set as long as possible so as to increase the area of the document P in the registration and skew correction region 13 as much as possible in performing the registration. In this way, the area in the read end of the document remaining in the curved transporting path 8 becomes smaller, and the correction is less influenced by the friction caused by the rear end portion of the document P.

Finishing the registration and the skew correction of the document P in the described manner, the registration rollers 14 are rotated at a predetermined timing, so as to send the document P to the reading position A1.

At the reading position A1, the CCD reading unit 10 reads one side of the document P being transported. Above the CCD reading unit 10, there is provided a guide G1. The document P is transported by being guided with the guide G1.

Figure 5:
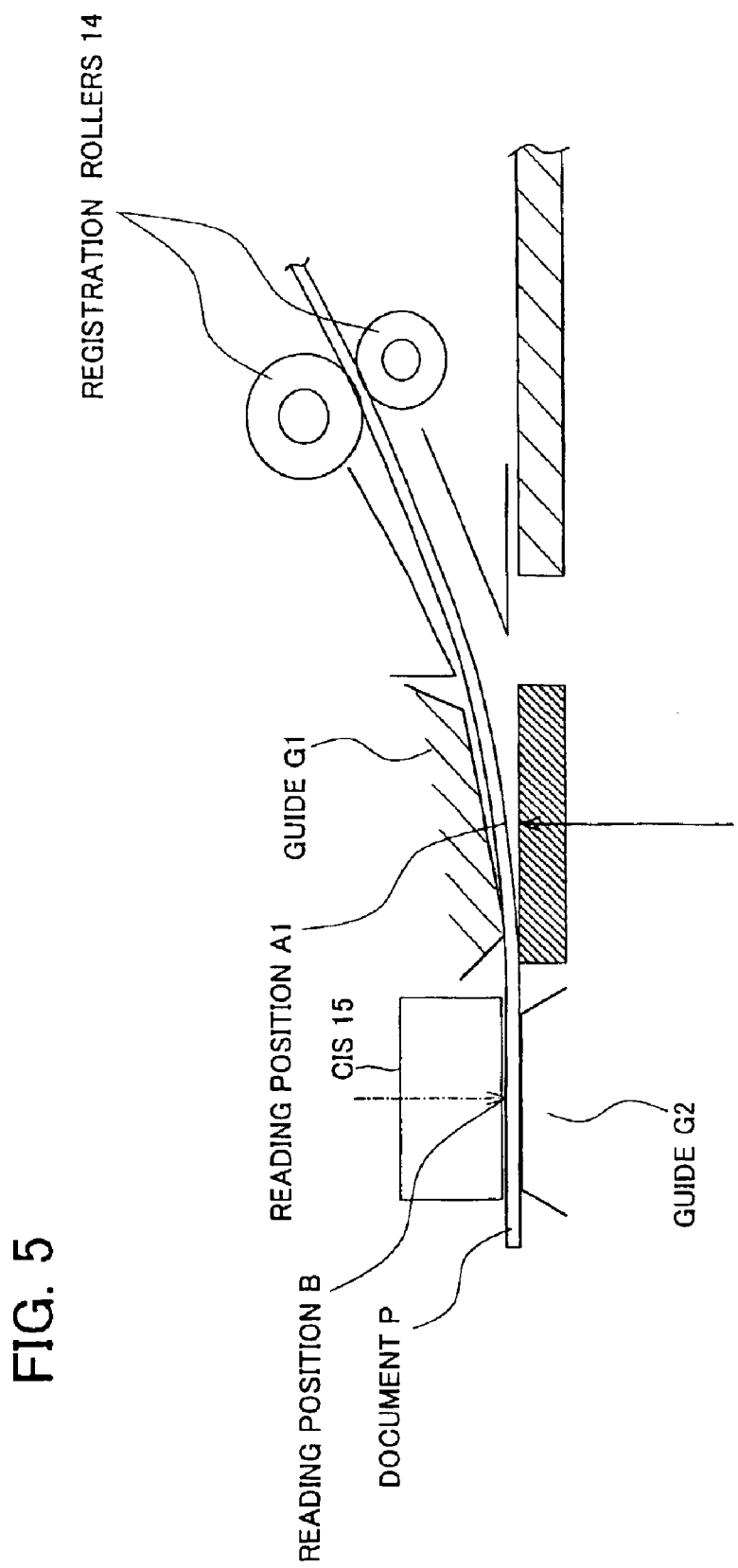
FIG. 5 is an enlarged schematic diagram illustrating a state of the image reading device in which a thick document passes over a reading position A1.
Figure 7:
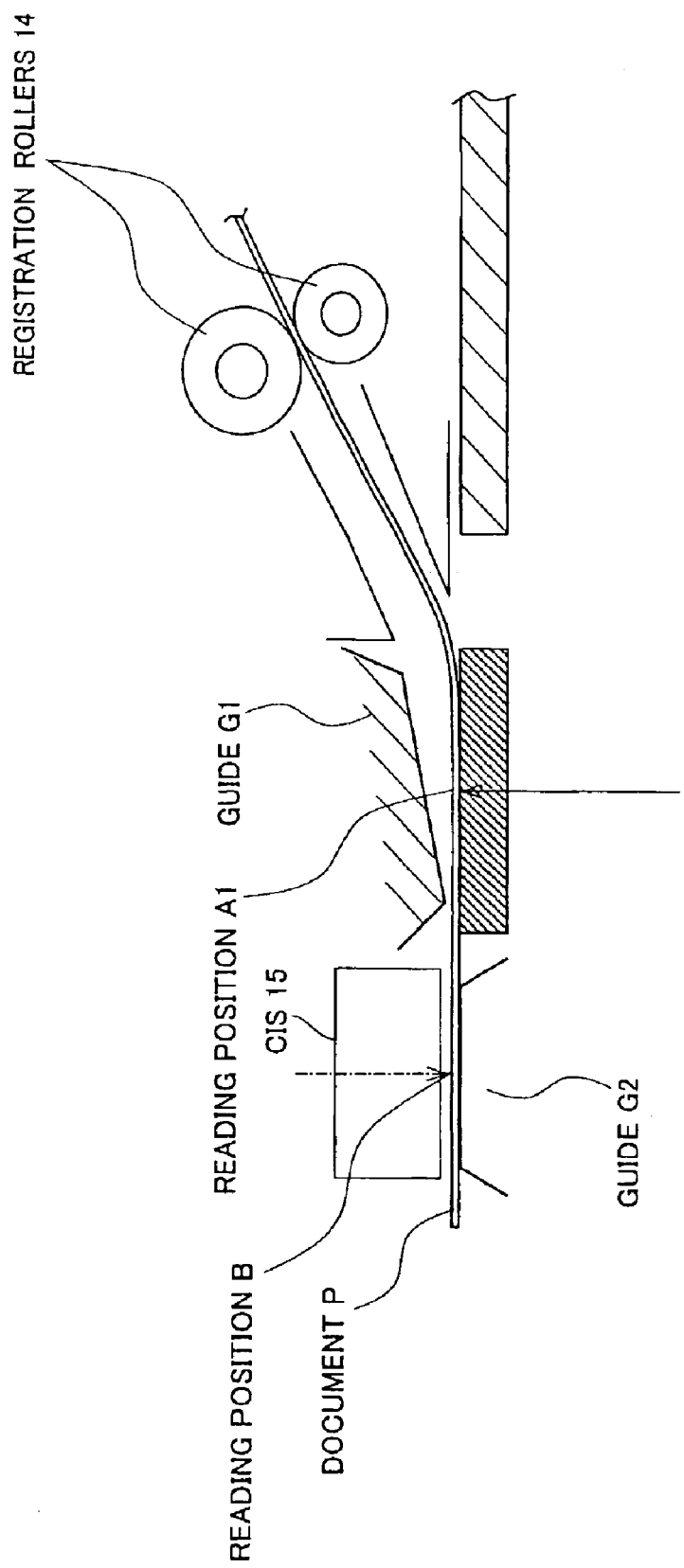
FIG. 7 is an enlarged schematic diagram illustrating a state of the image reading device in which a thin document passes over the reading position A1.

The CCD reading unit 10 has a depth of focus with a relatively wide compensation range. The guide G1 is positioned to ensure that the document P being transported falls within the range of the depth of focus of the CCD reading unit 10. This makes it possible to read the document P at the reading position A1 without fail, even when, for example, the reading position A1 of the document P is raised when the document P is stiff, as shown in FIG. 5, or when the reading position A1 of the document P is lowered when the document P is thin, as shown in FIG. 7.

The registration rollers 14 carry the document P further, so that the document P passes the reading position B. At the reading position B, the other side of the document P is read. As shown in FIG. 1, there is provided a guide G2 below the reading position B, so that the document P is transported along the path by being guided with the guide G2. As shown in FIGS. 2, 3, 4, and 8, the guide G2 and the glass board of the CCD reading point may be provided in the form of a single glass board as an extension of the glass document table 9 of the CCD reading unit 10. Alternatively, the guide G2 and the glass board of the CCD reading point may be provided together (not shown) as an extension of the latter.

The compensation range of a depth of focus of the CIS reading unit 15 is relatively narrow. However, at the reading position B of the CIS reading unit 15, the document P fed from the registration rollers 14 bends to only a limited extent, because the reading position B of the CIS reading unit 15 is apart from the registration rollers 14. This ensures that the document P is read at the reading position B without fail.

Moreover, the guide G2 is so designed that it is substantially parallel to a document reading surface of the CIS reading unit 15, and the document P falls within the range of the depth of focus of the CIS reading unit 15. This makes it possible to read the document P without fail. It is also possible to ensure that the document P does not fold while being read.

To supplement the descriptions above, the functions of the guides G1 and G2 are described below, with reference to FIGS. 5 to 7.

As shown in FIG. 5, when the document P is thick, the document P fed from the registration rollers 14 is relatively straight, owing to the stiffness of the sheet. In this case, the reading position A1 of the document P closer to the registration rollers 14 is distanced from the glass document table 9. In the present embodiment, however, the reading position A1 of the CCD reading unit 10 with wide compensation range of the depth of focus is closer to the registration roller 14, so as to ensure reading such a thick document P. Moreover, the area of the document P covered by the guide G1 is confined within the compensation range of the depth of focus of the CCD reading unit 10. This also makes sure that the document P is read properly.

Figure 6:
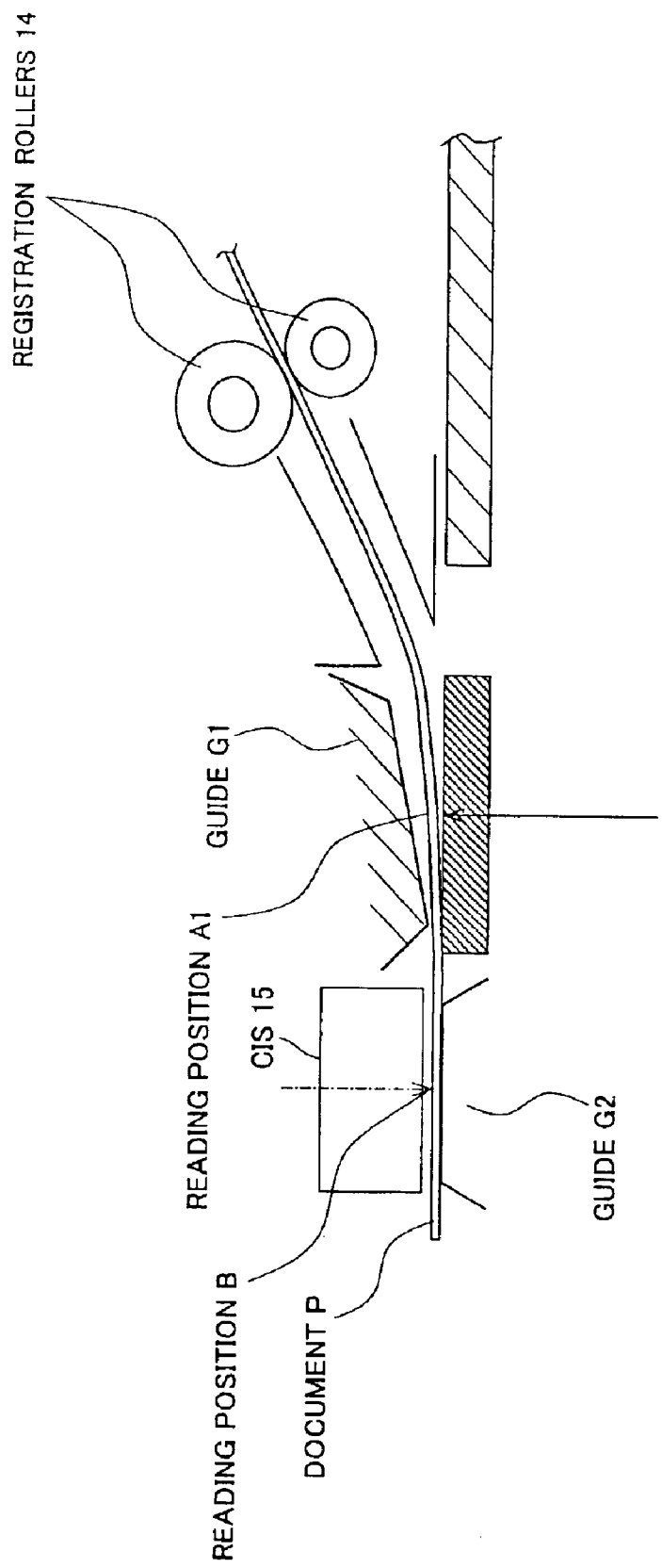
FIG. 6 is an enlarged schematic diagram illustrating a state of the image reading device in which a standard document passes over the reading position A1.

On the other hand, FIGS. 6 and 7 respectively illustrate cases where the document P has a normal thickness and the document P is thin. It should be noted here that the positional relationship between the CCD reading unit 10 and the CIS reading unit 15, and the functions of the guides G1 and G2 remain the same as to read the document P properly.

Turning back to FIG. 1, the document P, finished with the image reading, is ejected by the ejection rollers 16 to the ejection tray 18, which is located at a position lower than the document ejection point 17, and is formed on a side surface of the main body of the image reading device 1. At this stage, a sensor S6 ascertains whether or not the document P has been ejected.

With the operations above, the image reading device 1 guides the document P from the document stacking tray 2 via the curved transporting path 8 to the reading positions A1 and B, and ejects the document P to the ejection tray 18.

Figure 8:
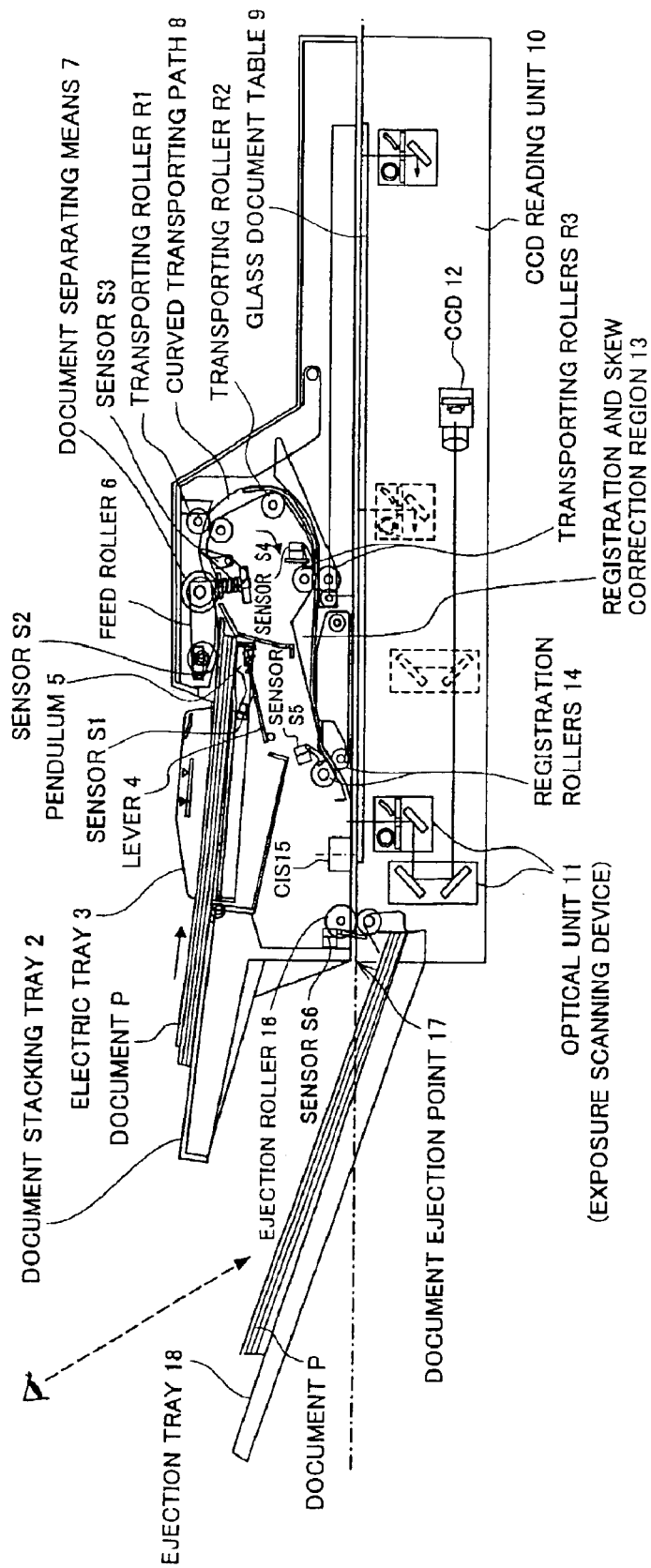
FIG. 8 is a block diagram illustrating a state of the image reading device in which documents have been ejected on an ejection tray.

In the same manner, as shown in FIG. 8, the image reading device 1 sequentially reads the other documents P stacked on the document stacking tray 2, by transporting out the foregoing operations.

Here, the electric tray 3 is raised in accordance with an output signal from the sensor S2 every time the document P is sent in, so as to compensate for a decrease in height of the stack of documents P on the document stacking tray 2 as a result of sending out document P. In this manner, the feed roller 6 and the surface of the uppermost sheet in the stack of documents P are kept in a predetermined contacting state. Further, the electric tray 3 can be lowered to a predetermined position so as to accommodate thick documents P or large volume of documents P.

Moreover, in the present embodiment, by utilizing the height of the curved transporting path 8 realizing a compact transporting path for the document P, the electric tray 3 can be raised or lowered within the height of the curved transporting path 8, from the level of the registration and skew correction region 13 at the exit of the curved transporting path 8 to the level of the feed roller 6 at the entrance of the curved transporting path 8. It should be noted that, in transporting the document P in a curved state as in the present embodiment, the thicker the documents P are, the smaller the curvature of the curved transporting path 8 should be. In this case, the height of the curved transporting path 8 from its entrance to exit is increased.

In this regard, the present embodiment makes it possible to accommodate a large volume of documents P by providing the electric tray 3 that can be raised or lowered within the height, which is necessary to carry relatively thick sheets of document P, of the curved transporting path 8 from its entrance to exit.

The operations above are repeated until no document P is left on the document stacking tray 2. All the documents P that have been read are sequentially ejected to the ejection tray 18.

As described above, the ejection tray 18 is provided on the side surface of the image reading device 1. Also, as shown in FIG. 8, the ejection tray 18 is so formed as to project sideways more than the document stacking tray 2 does. Therefore, the documents P that have been ejected onto the ejection tray 18 can be easily noticed by visual observation, without being hampered by the document stacking tray 2. Further, it is also easy to pick up the documents P from the ejection tray 18 after all the operations of the image reading device 1 have been finished.

With the foregoing configurations, the image reading device 1 of the present embodiment has the following advantages over the conventional configurations of the publications described in the Background of the Invention section.

Figure 10:
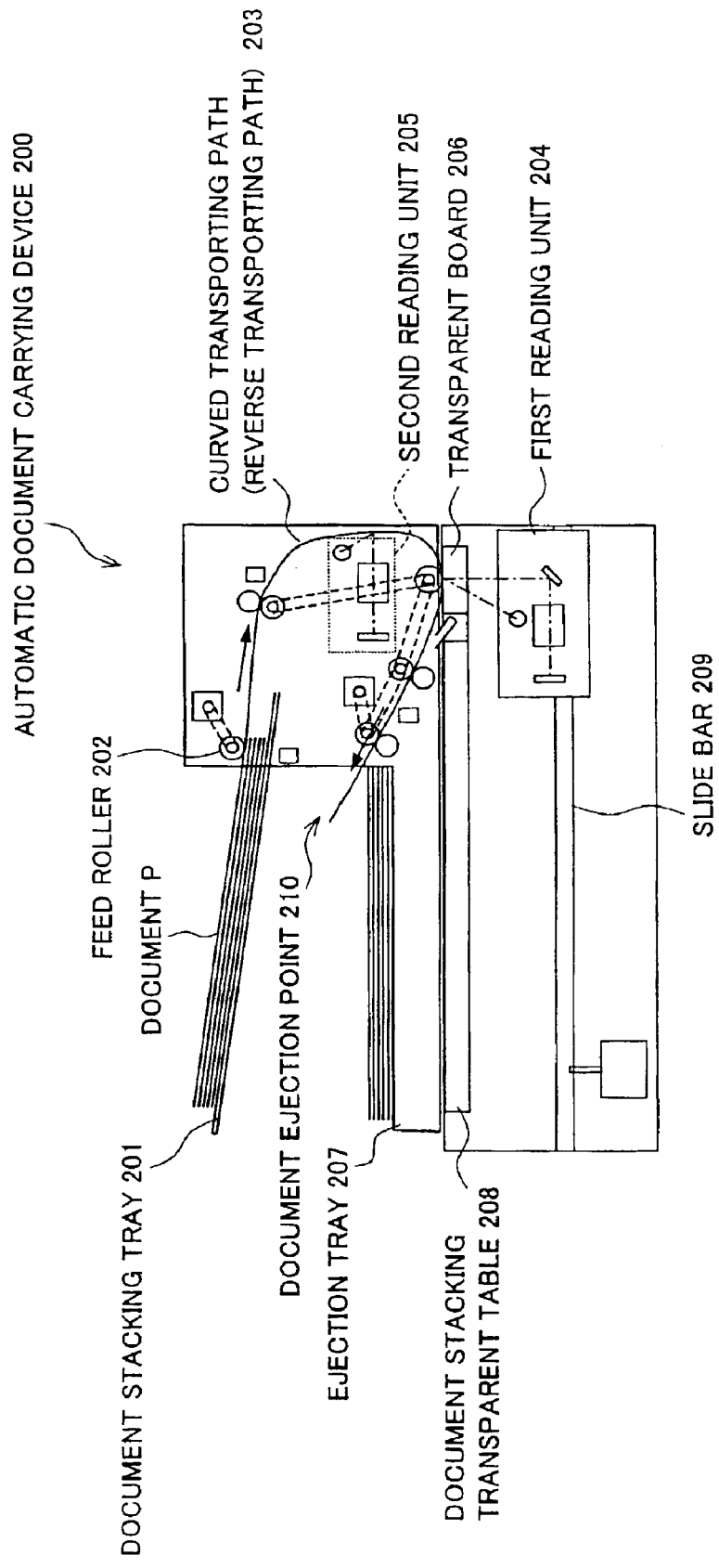
FIG. 10 is a block diagram illustrating an arrangement of another conventional image reading device.

The auto document feeder 200 of Tokukaihei 9-46472, having the arrangement as shown in FIG. 10, has the following problems.

In the arrangement of this publication, the document stacking tray 201 and the ejection tray 207 are positioned to overlap with each other. This makes it difficult to notice the ejected document P on the ejection tray 207. This may lead to a problem that the document P may be left unnoticed.

Moreover, because the document stacking tray 201 is provided immediately above the ejection tray 207 so as to cover the ejection tray 7 substantially completely, there may be an inconvenience in picking up the document P.

One possible reason for such a design is that the maximum number of documents P to be stacked on the document stacking tray 201 was assumed to be 50 or so, instead of a large number. The design-oriented thin configuration as that of the auto document feeder 200 described in Tokukaihei 9-46472 does not pose any problem so long as it is used under this condition. However, if the distance between the document stacking tray 201 and the ejection tray 207 is increased to handle a larger volume of documents P, the automatic document transporting device will become thicker, thereby ruining the design.

Further, in the arrangement of the foregoing publication, the sheets of document P is read by the first reading unit 204 immediately after passing through the curved transporting path 34 and is transported and ejected to the ejection tray 207, which is located at a position higher than the first reading point 204. For this reason, the curved transporting path 34 has a very large curvature in the vicinity of the reading point of the first reading unit 204. Therefore, there is a difficulty in stably transporting the document P, especially when the document P is thick. This may have an adverse effect on the image read by the first reading unit 204 (the image may be blurred, for example) or the document P may not be transported properly.

An attempt to solve this problem, for example, by simply increasing the size of the auto document feeder 200 and thereby reducing a portion of large curvature of the curved transporting path 34 in the vicinity of the reading position leads to another problem. Namely, this increases the required area for the installation of the automatic document transporting device 200, or the height of the automatic document transporting device 200.

Another problem of the foregoing configuration is that increasing the maximum number of documents P that can be stacked on the document stacking tray 201 may cause a problem in stably feeding the documents P by the feed roller 202 one at a time. This is because the height of the stack of documents P on the document stacking tray 201, which is gradually lowered as the documents P are picked up and transported sequentially, is lowered too much when the device is adapted to feed a large volume of documents P as above.

In short, the auto document feeder 200 has the problems that a large number of documents P cannot be processed successively, and that thick documents P cannot be transported stably.

Figure 11:
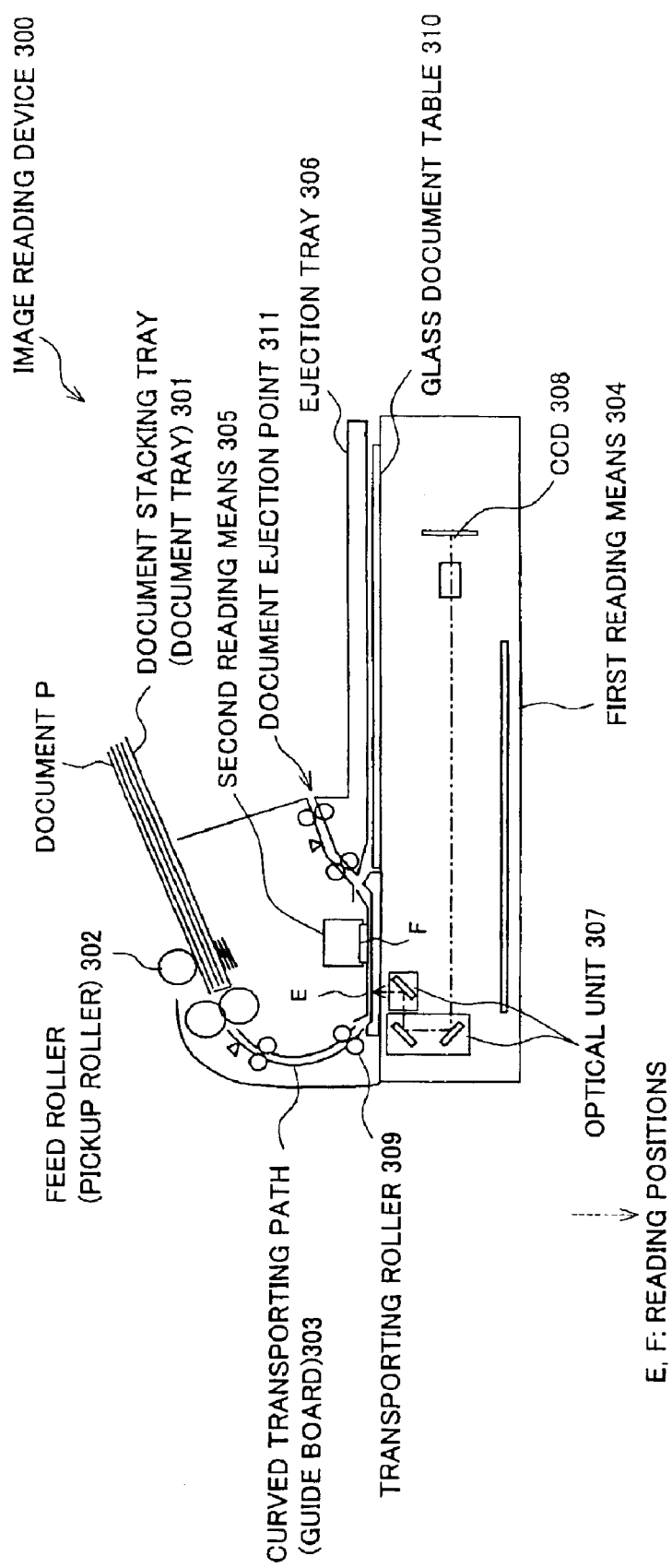
FIG. 11 is a block diagram illustrating an arrangement of yet another conventional image reading device.

The image reading device 300 of Tokukaihei 11-32164, having the arrangement shown in FIG. 11, has the following problems.

In the arrangement of this publication, the document P is transported by the transporting roller 309 from the curved transporting path 303 of a predetermined curvature to the reading position E. In this operation, the document P transported to the reading position E is held by a guide member or the like. As a result, if the document P is firm, a load (stress) may be generated due to friction between the document P and the guide member, thereby causing a problem in a transported state of the document P at the reading position E.

Also, in the arrangement of the foregoing publication, the document P that was read at the reading position F is ejected, via the transporting path, from the document ejection point 311. This creates a transitional area of a large curvature between the plane surface of the reading position F and the document ejection point 311. As a result, a load (resistance) may be generated in the transitional area, thereby adversely affecting the transported state of the document P at the reading position F. The problem of transporting the document P is even more aggravated when a large number of documents P are handled, because, in this case, the document ejection point 311 needs to be raised.

Further, in the arrangement of the foregoing publication, the reading position F of the second reading means 305 is provided between the reading position E of the first reading means 304 for reading the document P being transported, and the reading position of the first reading means 304 for reading the document (not shown) placed on the glass document table 310. Accordingly, for example, in order to read the document P being transported, and then, in a different reading mode, the document P (not shown) placed on the glass document table 310, the optical unit 307 needs to be moved by the additional distance between the optical unit 307 and the second reading means 305. This causes a problem that an extra time is required for switching the reading modes.

Figure 12:
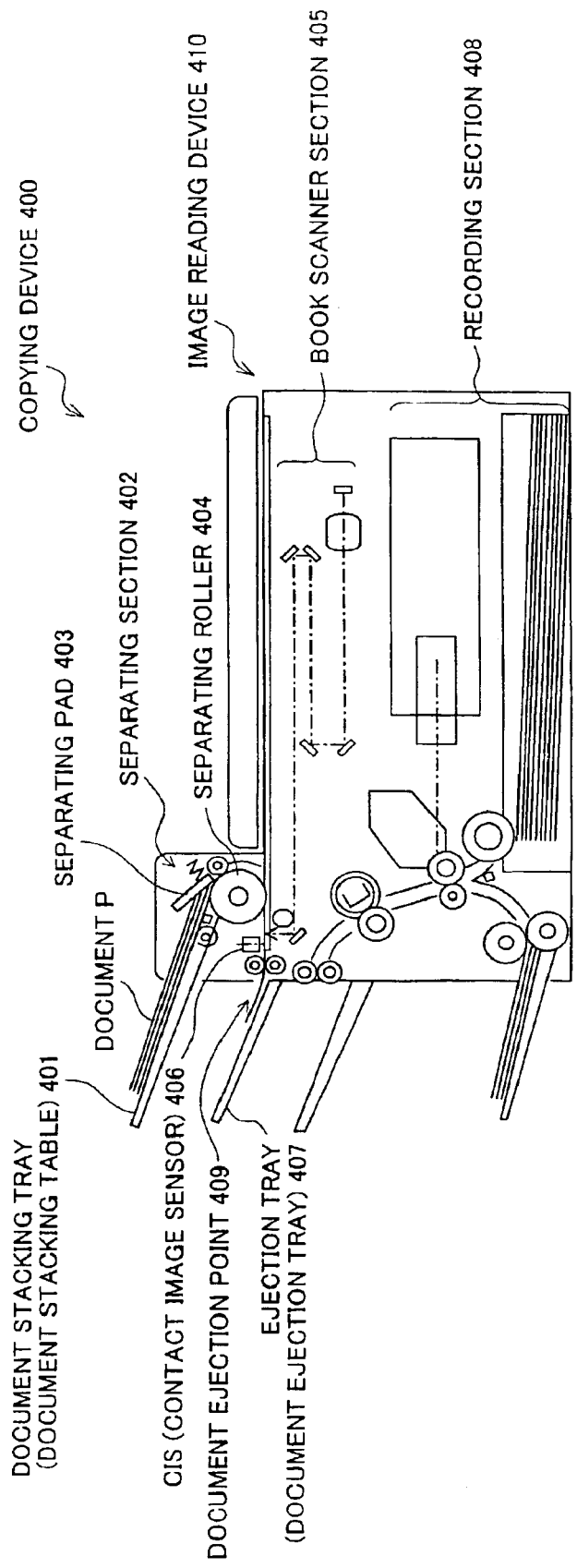
FIG. 12 is a block diagram illustrating an arrangement of still another conventional image reading device.

The copying device 400 having the document reading device 410 described in Tokukaihei 11-27444, having the arrangement shown in FIG. 12, has the following problems.

In the arrangement of this publication, the document stacking tray 401 and the ejection tray 407 are positioned to overlap with each other. This makes it difficult to notice the ejected documents P. This may lead to a problem that the documents P may be left unnoticed.

Moreover, because the document stacking tray 401 is provided immediately above the ejection tray 407, so as to cover the ejection tray 407 substantially completely, there may be an inconvenience in picking up the document P. There is also a problem that the size of the main body of the device is increased when a large volume of documents P are to be handled.

Further, in the arrangement above, the separating roller 404 carries the document P directly into a curved document transporting path and to the reading position. As a result, when the documents P are firm, as in thick sheets, there are cases where the document P may not be transported properly, a skew may occur on the document P, or the front end of the document P may be misaligned.

Moreover, in this arrangement, after the images on the document P have been read by the book scanner section 405 and the CIS 406, the document P is transported to the ejection tray 407 that is formed not horizontally but obliquely. As a result, the document P may fold in passing through a region having a large curvature in the vicinity of the document ejection point, thereby adversely affecting the reading operations by the book scanner section 405 and the CIS 406.

Figure 13:
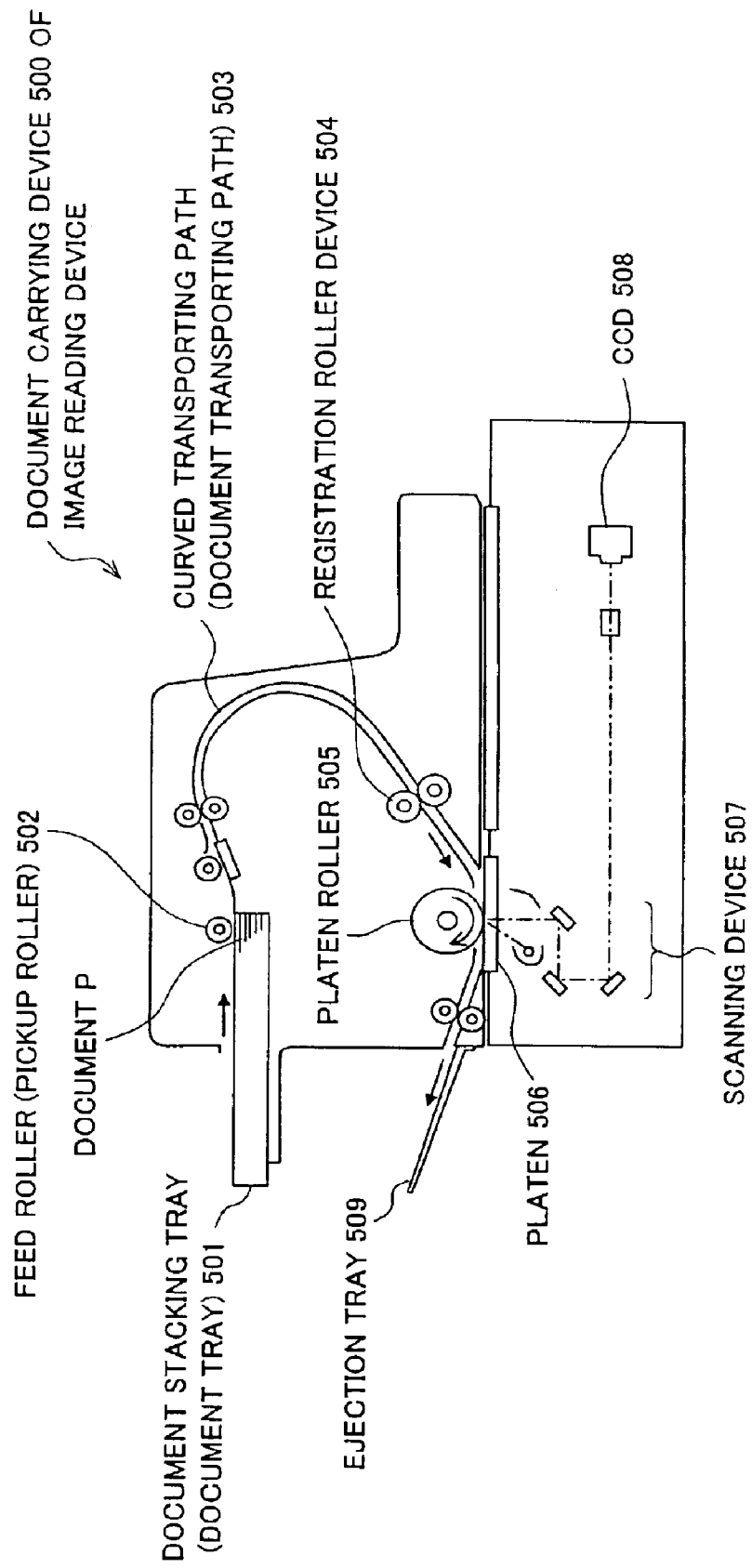
FIG. 13 is a block diagram illustrating an arrangement of yet another conventional image reading device.

The document transporting device 500 described in Toku-kaihei 8-34542, having the arrangement shown in FIG. 13, has the following problems.

In this arrangement, the registration roller device 504 sends the document P into the space between the platen roller 505 and the platen 506. As a result, there is a problem that a thickness of the document P sent to the space between the platen roller 505 and the platen 506 is limited.

Moreover, there is inconvenience in picking up the documents P because the document stacking tray 501 is disposed close to the ejection tray 509, so as to cover the ejection tray 509. Further, when a large number of documents P are to be handled, there is a problem that an installation area of the document transporting device 500 becomes larger, or the height of the document transporting device 500 is increased.

Further, in the arrangement of the foregoing publication, simply increasing the maximum number of documents P that can be stacked on the document stacking tray 501 may result in instable feeding of the documents P one at a time by the feed roller 502. This is because the height of the stack of documents P on the document stacking tray 501, which is gradually lowered as the documents P are picked up and transported sequentially, may be lowered too much when the device is adapted to feed a large number of documents, as described above.

Further, in the foregoing arrangement, the document P is transported from the curved transporting path 503 by the platen roller 505, and is ejected to the ejection tray 509, which is located at a position higher than the reading point. As a result, there is a portion of a large curvature in the curved transporting path 503 in the vicinity of the platen roller 505. Therefore, in transporting a firm document P, a load (resistance) may be generated due to friction in this part of the curved transporting path 503, thereby causing a problem in the transported state of the document P at the reading position.

These problems are solved by the image reading device 1 of the present embodiment in the manner described below.

As shown in FIG. 1, the ejection tray 18 is so provided as to protrude sideways from the image reading device 1 further than the document stacking tray 2 does. As a result, the ejected document P can be easily noticed because the ejection tray 18 is more visible. Therefore, it is possible to prevent the document P from being left unnoticed.

It is also easy to pick up the document P. Furthermore, unnecessary increase in size of the image reading device 1 can be avoided, even if the image reading device 1 is adapted to handle a large number of documents P.

Further, in the arrangement of the present embodiment, the registration and skew correction region 13 is provided and the documents P are transported and ejected in a substantially horizontal direction. Therefore, the curved transporting path 8 has a modest curvature. As a result, firm documents P, as in thick sheets, can be stably transported without fail, thereby ensuring, for example, that the images that have been read are not blurred, and that the documents P are transported properly.

Further, in the arrangement of the present embodiment, the electric tray 3 is raised as the documents P stacked on the document stacking tray 2 are sent out one sheet at a time, as described above. Therefore, it is possible to feed a document to the feed roller 6 without fail, even when a large number of documents P are used.

Further, the reading position B of the CIS reading unit 15 is located outside of the region where the reading positions A1 to A3 of the CCD reading unit 10 are located. Therefore, it is possible to quickly switch the reading modes without requiring the optical unit 11 to be moved by an additional distance as in the conventional example.

Moreover, as shown in FIG. 1, the document P is sent to a space between the reading surface of the CCD reading unit 10 and the guide G1, and to a space between the CIS reading unit 15 and the guide G2. These spaces are designed to have enough room for the document P to move freely. As a result, there is practically no limitation to the thickness of the document P sent to the reading positions A1 and B.

As described above, the image reading device 1 of the present embodiment is capable of transporting thick documents without fail, and processing a large number of documents.

In the present embodiment, the image reading device 1 is provided in, for example, a digital copying machine as an image forming apparatus. More specifically, the digital copying machine includes the image reading device 1 in an upper part of a copying device main body, and a printing section for forming images is provided in a lower part of the copying machine main body. The printing section supplies printer sheets, one sheet at a time, from a document tray, where the printer sheets are initially set, to a document transporting path. Then, using the printer sheets, the printing section prints out, at an image forming section (not shown), the image on the document P that has been read. Finally, the printing section ejects the printer sheet to a sheet ejection tray.

Although described above is a digital copying machine as an image forming apparatus including the image reading device 1, the present invention is not limited thereto. It is possible, for example, to transmit an image read from the document P by the image reading device 1 on a network to a printer (image recording apparatus) as another image forming apparatus, so as to print out the image. In the latter case, the image reading device 1 functions as a network scanner.

As described, in the image reading device of the present embodiment, the document stacking tray 2 includes the electric tray 3 that can be raised or lowered, and feeds the document P to the feed roller 6 by raising or lowering the document P. Therefore, even when a large number of documents P or thick documents P are stacked on the document stacking tray 2, it is possible to appropriately feed the document P to the feed roller 6 by appropriately raising the electric tray 3.

Further, in the present embodiment, the document on the electric tray 3 is raised or lowered within the height of the curved transporting path 8 from its level of entrance to its level of exit. Therefore, the presence of the electric tray 3 does not add to the height of the main body of the image reading device 1.

Further, because the provision of the electric tray 3 that can raise or lower the document P does not add to the height of the main body of the image reading device 1, an effort to decrease the curvature of the document P in the curved transporting path 8, for example, by increasing the height of the main body of the image reading device 1 can be accomplished without introducing an additional height by the electric tray 3. This makes it possible to realize the image reading device 1 in a compact size. Therefore, by decreasing the curvature of the document P in the curved transporting path 8, for example, it is ensured that the documents P are stably fed, even when the documents P are thick.

As a result, it is possible to provide an image reading device 1 capable of separating and transporting a large number of documents P and efficiently reading images from the documents P, even when the documents P are thick.

Moreover, in the image reading device 1 of the present embodiment, the electric tray 3 of the document stacking tray 2 raises or lowers the document P in feeding the document P to the feed roller 6, so that the document P becomes parallel to the direction in which the feed roller 6 picks up the document P. As a result, it is possible to stably feed the document P regardless of the thickness (thick or thin) of the document P or type of the documents P.

Meanwhile, there are cases, where, for example, the curved transporting path 8 needs to be extended so as to attain such a curvature as to allow thick and firm sheets of document P to be smoothly transported. In this case, for example, if the curved transporting path 8 is curved toward the outside of the main body of the image reading device 1 with respect to the reading position (toward left in FIG. 1), the curved transporting path 8 cannot be extended unless it is formed to stick out of the main body of the image reading device 1. In this case, the image reading device 1 becomes peculiar in terms of both function and design.

On the other hand, in the present embodiment, the curved transporting path 8 is curved toward an end of the main body of the image reading device with respect to the reading position on the other end of the main body of the image reading device 1, within the installation width of the main body of the image reading device 1. In this way, it is possible to extend the curved transporting path 8 toward inside the image reading device 1, so as to attain such a curvature as to allow, for example, thick and firm documents P to be smoothly transported.

As a result, it is possible to install the image reading device 1 in a smaller space than that required when the curved transporting path 8 is curved within a range of the installation width of the main body of the image reading device 1 outwardly from the reading position toward the opposite side of the image reading device 1, so as to set such a curvature for the document P in the curved transporting path 8 that allows the document P to be smoothly transported. Specifically, by so forming the curved transporting path 8 as to be curved toward one end of the main body of the image reading device 1 with respect to the reading position on the other end of the main body of the image reading device, the other members can also be provided within the installation width, so as to reduce the space required to install these members. Moreover, the positional relationships between these members can be more freely set, so as to allow for easier design.

In this way, it is possible to more easily design the curved transporting path 8 so as to set such a curvature for the document P that the document P is transported smoothly, thereby ensuring that the documents P are supplied and transported stably.

Moreover, in the image reading device 1 of the present embodiment, the ejection roller 16 is so positioned that a document ejection position of the ejection roller 16 and the document reading points of the CCD reading unit 10 and the CIS reading unit 15 are on the same level. This makes it possible to read and eject, without curving, the document P being transported. As a result, it is possible to ensure image reading to prevent deficiency such as blur.

Further, in the present invention, a document stacking position on the ejected document stacking tray 18 is lower than the document ejection position of the ejection roller 16. Therefore, even when a large number of documents P are read, it is possible to ensure that the documents P after reading are stacked on the ejection tray 18. Further, it is also possible to easily pick up the documents P stacked on the ejection tray 18.

Moreover, by the provision of the image reading device 1, the copying device as the image forming apparatus of the present embodiment is capable of reading and printing a large number of documents of various kinds.

In this way, it is possible to provide a copying device as an image forming apparatus capable of separating and transporting a large number of documents and efficiently reading images from the documents, even when the documents are thick.

In the image reading device 1 of the present embodiment, the image reading device 1 guides the document P to the CCD reading unit 10 and the CIS reading unit 15 after the document P that has been transported through the curved transporting path 8 passes the registration and skew correction region 13.

Thus, by causing the document P to pass through the registration and skew correction region 13 before the document P is read, it is possible to stabilize the transported state of the document P, which may have become unstable on its way through the curved transporting path 8. Image reading is thus ensured by stabilizing the transported state of the document P when reading the image.

Moreover, because the registration and skew correction region 13 has a plane surface, it is possible to correct the transported state of the document P within the plane.

As a result, it is possible to provide an image reading device 1 capable of separating and transporting a large number of documents P and efficiently reading images therefrom P even when the documents P are thick.

In the image reading device 1 of the present embodiment, the transporting rollers R3 and the registration rollers 14 perform registration and skew correction of the document P passing through the registration and skew correction region 13, and then send the document P to the CCD reading unit 10 and the CIS reading unit 15.

Accordingly, the transporting rollers R3 and the registration rollers 14 perform the registration and skew correction on the document P not in a curved state but in a flat state on the flat surface of the registration and skew correction region 13. This makes it possible to more stably perform the registration and skew correction as compared with the case where the document P is bent and subjected to extra frictional resistance by contacting the curved surface of the curved transporting path 8.

In the image reading device 1 of the present embodiment, the transporting rollers R3 carry the document P via the registration and skew correction region 13 to the registration rollers 14. When the front end of the document P reaches the registration rollers 14, the transporting rollers R3 performs the registration and skew correction on the document P temporality stopping the document P at the registration and skew correction region 13. Then, the registration rollers 14 transport the document P to the CCD reading unit 10 and the CIS reading unit 15.

Thus, because the registration and skew correction of the document P is performed by temporarily stopping the document P at the registration and skew correction region 13, it is possible to perform the registration and skew correction more certainly.

Further, in the image reading device 1 of the present embodiment, the area created on a horizontal plane by projecting an area of the document stacking tray 2 occupied by the document P stacked thereon over an area of the ejection tray 18 occupied by the document P ejected thereon is no larger than half the size of the document P.

Thus, because the overlapping area of the document P stacked on the document stacking tray 2 and the document P stacked on the ejection tray 18 is smaller than half the size of the document P, when viewed above for example, a user can see at least half of the document P. As a result, the documents P that are stacked on the document stacking tray 2 and on the ejection tray 18 can be easily noticed.

The image forming apparatus of the present embodiment, by the provision of the image reading device 1, is able to ensure reading and printing a large number of documents P of various kinds.

In this way, it is possible to provide an image forming apparatus capable of separating and transporting a large number of documents P and efficiently reading images therefrom even when the documents P are thick.

Moreover, in the image reading device 1 of the present embodiment, the image reading means includes the CCD reading unit 10 for reading one side of the document P that has been transported by the registration rollers 14, and the CIS reading unit 15 for reading the other side of the document that has been read by the CCD reading unit 10. Thus, the image reading device 1 guides the document P from the curved transporting path 8 via the registration rollers 14 to the CCD reading unit 10 and the CIS reading unit 15. Then, the image reading device 1 reads the document P by the CCD reading unit 10 and the CIS reading unit 15 in this order.

Here, the registration rollers 14 and the transporting rollers R3 are provided to perform the skew correction on the document P and adjust a timing of sending the front end of the document P. Therefore, the images on the both sides of the document P can be appropriately read after the transportation of the document P is stabilized by the front end adjustment and the skew correction with the registration rollers 14 and the transporting rollers R3.

In this embodiment, the CCD 12 of the CCD reading unit 10 has a depth of focus whose compensation range is wider than that of the CIS reading unit 15. Therefore, in order to read images from the both sides of the document P, the CCD 12 of the CCD reading unit 10, whose depth of focus has a wider compensation range than that of the CIS reading unit 15, is disposed before the CIS reading unit 15. Here, the term "depth of focus" refers to a range in which a clear image can be obtained in front of and behind the focal plane.

When sending the document P to the respective reading positions of the CCD reading unit 10 and the CIS reading unit 15, the extent to which the document P being transported will be bent depends on the thickness of the document P. Specifically, the document P will not be bent at a position distanced from the registration roller 14 because the document P is free. On the other hand, on a halfway point from the registration rollers 14, the extent to which the document P will be bent depends on the thickness of the document P.

More specifically, when sending the document P to the reading position on a horizontal surface from the registration rollers 14 disposed diagonally above, for example, the document P will contact the horizontal surface at a distant position from the registration roller 14 and will not be bent. On the other hand, on a halfway point from the registration rollers 14, i.e., between the registration rollers 14 and the reading position B, the document P will be bent (warped) to the extent that is determined by the thickness of the document P, and a spacing is created between the document P and the horizontal surface. The thicker the document P is, the larger is the spacing at the halfway point.

To overcome this drawback, in the present embodiment, the reading position A1 of the CCD 12 of the CCD reading unit 10, having the wider depth of focus, is disposed closer to the registration rollers 14 where the document P is bent to a greater extent, and the CIS reading unit 15, having the narrower depth of focus, is disposed farther from the registration rollers 14 where the document P is bent to a lesser extent. As a result, the document P can be read without fail both at the reading position A1 and reading position B.

This guarantees that the document P is stably transported and is read without fail. This ensures that the document P is read even when a large number of documents P need to be successively read or the documents P are thick.

As a result, it is possible to provide an image reading device 1 capable of separating and transporting a large number of documents P and efficiently reading images therefrom even of the documents P are thick.

In the arrangement of the conventional image reading device, because the registration rollers 14 and the transporting rollers R3 are not provided, the document P may not be transported stably or a skew may be generated on the document P in transporting the document P from the curved transporting path 8 to the image reading means including the CCD reading unit 10 and the CIS reading unit 15.

Also, even in the arrangement in which the image reading device is provided with the image reading means including the CCD reading unit 10, and the registration rollers 14 for example, the reading points place a thickness restriction on the document P being passed. This causes a problem that thick documents P cannot be read.

In the image reading device 1 of the present embodiment, on the other hand, a large number of documents P can be read even when the documents P are thick, as described above.

In the image reading device 1 of the present embodiment, the curved transporting path 8 has a uniform curvature over the entire path.

If the curvature of the curved transporting path 8 varies from region to region for example, the document P, which is transported in a curved state, will not be transported under a uniform state (condition) within the curved transporting path 8. This causes such problems as a misaligned front end of the document P, or a skew on the document P.

In order to overcome this drawback, in the present embodiment, the curved transporting path 8 has a uniform curvature over the entire path. As a result, even relatively thick documents P can be transported through the entire length of the curved transporting path 8 under a substantially uniform condition, thereby transporting the document P without trouble.

In the case where, for example, the CIS reading unit 15 is provided within the region in which the optical unit 11 moves to read the document P, in order to switch the reading modes for reading the document P being transported and for reading the document P that is stationary, it is necessary to move the reading position by the additional distance between the optical unit 11 and the CIS reading unit 15.

In the present embodiment, the CCD reading unit 10 includes the optical unit 11 that reads the document P by moving its reading position within a predetermined region with respect to the document P that is fixed in a position on the document stacking transparent table 9, while the CIS reading unit 15 is disposed outside of the predetermined region for the optical unit 11.

As a result, it is possible to quickly switch the reading modes for reading the document P being transported and for reading the fixed document P by moving the optical unit 11 with respect to the sheets of document P.

In the image reading device 1 of the present embodiment, the guide G1 is provided for guiding the document P that has been fed from the registration rollers 14. The guide G1 is provided opposite the reading position A1 of the CCD reading unit 10, so as to guide the document P within the range of the depth of focus of the CCD 12 of the CCD reading unit 10.

In this way, even when a thick document P is fed to the reading position A1 for example, the document P can be smoothly guided within the range of the depth of focus of the CCD 12 of the CCD reading unit 10. This ensures that the document P is transported stably and read accurately.

In this arrangement, the guide G1 is preferably provided to create a wider opening toward the incoming document P.

In the image reading device 1 of the present embodiment, the guide 2 is provided for guiding the document P that has been read by the CCD reading unit 10. The guide G2 is provided at the reading position B of the CIS reading unit 15 and in parallel to the document reading surface of the CIS reading unit 15.

As a result, the document P that has been read by the CIS reading unit 15 can be ejected without being bent. In other words, it is possible to eject the document P from the reading position B of the CIS reading unit 10 without changing the state of the document P after it is read. Therefore, the document P can be transported without any abnormality that may be caused by the configuration of the curved transporting path 8. Moreover, the images on the document P can be read without blurring or distortion.

The digital copying machine of the present embodiment, by the provision of the image reading device 1, is able to read and print a large number of documents of various kinds.

As a result, it is possible to provide a digital copying machine capable of separating and transporting a large number of documents P and efficiently reading images therefrom even when the documents P are thick.

As described, to solve the problems above, an image reading device of the present invention includes: an image reading device including: document stacking means for stacking a document; document feeding means for picking up, one sheet at a time, the document stacked on the document stacking means; a curved transporting path through which the document picked up by the document feeding means is transported; and image reading means for reading an image from the document, the document stacking means including document lifting and lowering means for lifting or lowering the document stacked on the document stacking means within a range of a height of the curved transporting path, so as to feed the document to the document feeding means.

In this invention, the document stacking means includes the document lifting and lowering means capable of lifting or lowering the document, so that the document can be lifted or lowered when feeding the document to the document feeding means. This enables the document to be suitably fed to the document feeding means by suitably lifting the document lifting and lowering means, even when a large number of documents or thick documents are stacked on the document stacking means.

In the present invention, the document lifting and lowering means is capable of lifting or lowering the document within the range of the height of the curved transporting path. As a result, there will be no additional increase in the height of the main body of the image reading device. Moreover, even when the curvature of the document in the curved transporting path is decreased by increasing the height of the main body of the image reading device for example, it is possible to keep the main body of the image reading device compact because the document lifting and lowering means can raise or lower the document without adding to the height of the main body of the image reading device. Therefore, by decreasing the curvature of the document in the curved transporting path for example, it is possible to stably transport the document even when the document is thick.

As a result, it is possible to provide an image reading device capable of separating and transporting a large number of documents, and efficiently reading images therefrom even when the documents are thick.

Further, in the image reading device of the present invention, the document lifting and lowering means of the document stacking means lifts or lowers the document, so that the document is fed to the document feeding means in a direction parallel to a direction in which the document is picked up by the document feeding means.

In this invention, the document lifting and lowering means of the document stacking means lifts or lowers the document so that the document is fed to the document feeding means in a direction parallel to the direction in which the document feeding means picks up the document. As a result, it is possible to stably feed the document regardless of the thickness (thick or thin) or type of the document.

Further, in the image reading device of the present invention, the curved transporting means is curved outward into the main body of the image reading device and within the installation width of the main body of the image reading device, i.e., the curved transporting path is curved toward one end of a main body of the image reading device with respect to a reading position on the other end of the main body of the image reading device, within an installation width of the main body of the image reading device.

For example, there are cases the curved transporting means needs to be extended so as to attain such a curvature as to allow a thick and firm document to be smoothly transported. In this case, for example, if the curved transporting means is curved toward the outside of the main body of the image reading device and within the installation width of the main body of the image reading device, i.e., curved toward the outside of the main body of the image reading device with respect to the reading position, the curved transporting path cannot be extended unless it is formed to stick out of the main body of the image reading device. In this case, the image reading device becomes peculiar in terms of both function and design.

On the other hand, in the present invention, the curved transporting path is curved toward the center of the main body of the image reading device and within the installation width of the main body of the image reading device. That is, the curved transporting path is curved toward one end of a main body of the image reading device with respect to a reading position on the other end of the main body of the image reading device, within an installation width of the main body of the image reading device.

Therefore, the curved transporting path can be designed to extend toward the center of the main body of the image reading device, so as to attain such a curvature as to allow, for example, thick and firm documents to be smoothly transported through the curved transporting path.

As a result, it is possible to install the image reading device in a smaller space than that required when the curved transporting path is curved toward the outside of the center of the main body of the image reading device and within the installation width of the main body of the image reading device, so as to set such curvature for the document in the curved transporting path that allows the document to be smoothly transported. Specifically, by so forming the curved transporting path as to be curved toward the center of the main body of the image reading device and within the installation width of the main body of the image reading device, the other members can also be provided within the installation width, so as to reduce the space required to install these members. Moreover, the positional relationships between these members can be more freely set, allowing for easier design.

In this way, it is possible to more easily design the curved transporting path so as to set such a curvature for the document that the document is transported more smoothly, thereby ensuring that the document is fed and transported stably.

Moreover, the image reading device of the present invention further includes: ejection means for ejecting the document that has been read by the image reading means; and ejected document stacking means for stacking the document ejected by the ejecting means, wherein the ejection means is so positioned that a document ejection position of the ejection means and a document reading position of the image reading means are on the same level, and wherein the ejected document stacking means is so positioned that a document stacking position of the ejected document stacking means is lower than the document ejection position of the ejection means.

In this invention, the ejection means and the image reading means are positioned on the same level. This makes it possible to read and eject the document being transported without curving it. As a result, it is possible to ensure images are read without blurring and the like.

Further, in the present invention, the ejected document stacking means is positioned lower than the ejection means. Therefore, even when a large number of documents are read, it is possible to ensure that the documents are stacked on the ejected document stacking means after image reading. Further, it is also possible to easily pick up the documents that are stacked on the ejected document stacking means.

Moreover, to solve the problems above, an image forming apparatus of the present invention is provided with the image reading device.

In this invention, the image forming apparatus includes the image reading device. Therefore, it is possible to read and print a large number of documents of various kinds.

As a result, it is possible to provide an image forming apparatus capable of separating and transporting a large number of documents and efficiently reading images therefrom even when the documents are thick.

To solve the problems above, an image reading device of the present invention includes: document stacking means for stacking a document; document feeding means for picking up, one sheet at a time, the document stacked on the document stacking means; a curved transporting path through which the document picked up by the document feeding means is transported; and image reading means for reading an image from the document, said image reading device further including: a planar correction region, provided between the curved transporting path and the image reading means, where correction of the document is performed to adjust a transported state of the document.

In this invention, the image reading device guides the document to the image reading means after the document that has been transported through the curved transporting path passes through the correction region.

In this way, by causing the document to pass through the correction region before the document is read, it is possible to stabilize the transported state of the document, which may have become unstable on its way through the curved transporting path. Image reading is thus ensured by stabilizing the transported state of the document when reading the image.

As a result, it is possible to provide an image reading device capable of separating and transporting a large number of documents, and efficiently reading images therefrom even if the documents are thick.

The image reading device of the present invention further includes: correction means for performing registration and skew correction on the document that passes through the correction region, and sending the document to the image reading means.

In this invention, the correction means perform registration and skew correction on the document that passes through the correction region, and then sends the document to the image reading means.

The correction means performs the registration and skew correction on the document that are not in a curved state but in a flat state on the flat surface of the correction region. This makes it possible to more stably perform the registration and skew correction as compared with the case where, for example, the document is bent and subjected to extra frictional resistance by contacting the curved surface of the curved transporting path.

Further, in the image reading device of the present invention, the correction means includes: sending means for sending the document from the curved transporting path to the correction region; and registration means for temporarily stopping, at the correction region, the document that was sent from the curved transporting path, and the correction means performs registration and skew correction on the document by temporarily stopping the document at the correction region, when the document, which was sent by the transporting means from the curved transporting region, reaches the registration means.

In this invention, the sending means of the correction means sends the document via the correction region to the registration means. When the front end of the document reaches the registration means, the registration and skew correction of the sheet of document are performed by temporality stopping the document at the correction region. Then, the registration means of the correction means sends the document to the image reading means.

Thus, because the registration and skew correction of the document is performed by temporarily stopping the document at the correction region, it is possible to perform the registration and skew correction more certainly.

The image reading device of the present invention further includes ejected document stacking means for stacking the document after the image is read from the document by the image reading means, wherein an area created on a horizontal plane by projecting an area of the document stacking means occupied by the document stacked thereon over an area of the ejected document stacking means occupied by the document ejected thereon is no larger than half a size of the document.

In this invention, the area created on a horizontal plane by projecting the area of the document stacking means occupied by the document stacked thereon over the area of the ejected document stacking means occupied by the document ejected thereon is no larger than half the size of the document.

Thus, because the overlapping area of the document stacked on the document stacking means and the document ejected on the ejected document stacking means is no larger than half the size of the document, when a user sees the document from above for example, the user is able to see at least half of the document. As a result, the document stacked on the document stacking means and the document ejected on the ejected document stacking means can be easily noticed.

To solve the problems above, an image forming apparatus of the present invention is provided with the image reading device.

With this invention, by the provision of the image reading device, the image forming apparatus is able to read and print a large number of documents of various kinds.

As a result, it is possible to provide an image forming apparatus capable of separating and transporting a large number of documents and efficiently reading images therefrom even when the documents are thick.

To solve the problems above, an image reading device of the present invention includes: document stacking means for stacking a document; document feeding means for picking up, one sheet at a time, the document stacked on the document stacking means; a curved transporting path through which the document picked up by the document feeding means is transported; image reading means for reading an image from the document; and registration means for performing registration on the document that has been transported via the curved transporting path, the image reading means including: charge coupled device reading means for reading one side of the document that has been transported via the registration means; and contact image sensor reading means for reading the other side of the document that has been read by the charge coupled device reading means, the charge coupled device reading means having a depth of focus whose compensation range is wider than that of the contact image sensor reading means.

In this invention, the image reading means includes the CCD reading section for reading one side of the document that has been transported via the registration means, and the CIS reading means for reading the other side of the document that has been read by the CCD reading means. The image reading device guides the document from the curved transporting path via the registration means to the image reading means. Then, the image reading means reads the document by the CCD reading means and the CIS reading means in this order.

Here, the registration means is provided to perform skew correction on the document being transported, and to adjust a timing of sending the front end of the document. Therefore, the images on the both sides of the document can be read after the transported state of the document has been stabilized by the front end adjustment and the skew correction of the registration means.

In this invention, the CCD reading means has a depth of focus whose compensation range is wider than that of the CIS reading means. Therefore, in order to read images, the CCD reading means, whose depth of focus has a wider compensation range than that of the CIS reading means, is disposed before the CIS reading means. Here, the term "depth of focus" refers to a range in which a clear image can be obtained in front of and behind the focal plane.

When sending the document to the reading position of the image reading means, the extent to which the document being transported will be bent depends on the thickness of the document. Specifically, the document will not be bent at a position distanced from the registration means because the document is free. On the other hand, on a halfway point from the registration means, the extent to which the document will be bent depends on the thickness of the document.

More specifically, when sending the document to the reading position on a horizontal surface from the registration means which is disposed diagonally above for example, the document will contact the horizontal surface at a distant position from the registration means and will not be bent. On the other hand, on a halfway point from the registration means, i.e., between the registration means and the reading position, the document will be bent (warped) to the extent that is determined by the thickness of the document, and a spacing is created between the document and the horizontal surface. The thicker the document, the larger is the spacing at the halfway point.

To overcome this drawback, in the present invention, the CCD reading means, whose depth of focus has a wider compensation range than that of the CIS reading means, is disposed closer to the registration means where the document is bent to a greater extent, and the CIS reading means, having the narrower depth of focus, is disposed farther from the registration means where the document is bent to a lesser extent. As a result, the document can be read without fail at the both reading positions.

This guarantees that the document is stably transported and is read without fail. This ensures that the document is read even when a large number of documents needs to be successively read or the documents are thick.

As a result, it is possible to provide an image reading device capable of separating and transporting a large number of documents and efficiently reading images therefrom even when the documents are thick.

Moreover, in the image reading device of the present invention, the curved transporting path has a uniform curvature over an entire path of the curved transporting path.

If the curvature of the curved transporting path varies from region to region for example, the document, which is transported in a curved state, will not be transported under a uniform state (condition) within the curved transporting path. This causes such problems as a misaligned front end of the document, or a skew on the document.

In order to overcome this drawback, in the present invention, the curved transporting path has a uniform curvature over the entire path. As a result, even relatively thick documents can be transported through the curved transporting path under a substantially uniform condition, thereby transporting the document without trouble.

Further, in the image reading device of the present invention, the charge coupled device reading means includes movable reading means for reading the document by moving a reading position within a predetermined reading region with respect to a document that is fixed in position on a document stacking transparent table, and the contact image sensor reading means is disposed outside of the predetermined reading region for the movable reading means.

In the case where, for example, the CIS reading means is provided within the region in which the movable reading means moves to read the document, in order to switch the reading modes for reading the document being transported and for reading the document that is stationary, it is necessary to move the reading position by an additional distance between the movable reading means and the CIS reading means.

In the present invention, the CCD reading means includes the movable reading means for reading the document by moving the reading position within a predetermined region with respect to the document that is fixed in position on the document stacking transparent table, while the CIS reading means is disposed outside of the predetermined region for the movable reading means.

As a result, it is possible to quickly switch the reading modes for reading the document being transported and for reading the fixed document by moving the movable reading means with respect to the document.

Further, the image reading device of the present invention further includes: a first guide member for guiding the document that is sent from the registration means, the first guide member being disposed opposite the reading position of the charge coupled device reading means, and guiding the document within the compensation range of the depth of focus of the charge coupled device reading means.

In this invention, the first guide member is provided for guiding the document that is sent out from the registration means. The first guide member is disposed opposite the reading position of the CCD reading means, and guides the document within the compensation range of the depth of focus of the CCD reading means.

As a result, even when, for example, a thick document is fed to the reading position, the document can be smoothly guided within the range of the depth of focus of the CCD reading means. This ensures that the document is stably transported and is read without fail.

In this arrangement, it is preferable that the first guide member is provided to create a wider opening toward the incoming document.

Moreover, the image reading device of the present invention further includes a second guide member for guiding the document that has been read by the CCD reading means. The second guide member is provided at the reading position of the CIS reading means and in parallel to the document reading surface of the CIS reading means.

In this invention, the second guide member is provided for guiding the document that has been read by the CCD reading means. The second guide member is provided at the reading position of the CIS reading means and in parallel to the document reading surface of the CIS reading means.

As a result, the document that was read by the CIS reading means can be ejected without bending. In other words, it is possible to eject the document from the reading position of the CIS reading means without changing the state of the document after it is read. Therefore, the document can be transported without any abnormality that may be caused by the configuration of the curved transporting path. Moreover, the images on the document can be read without blurring or distortion.

An image forming apparatus of the present invention includes the image reading device.

Therefore, it is possible to read and print a large number of documents of various kinds.

As a result, it is possible to provide an image forming apparatus capable of separating and transporting a large number of documents and efficiently reading images therefrom even when the documents P are thick.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An image reading device comprising:

document stacking means for stacking a document;

document feeding means for picking up, one sheet at a time, the document stacked on the document stacking means;

a curved transporting path through which the document picked up by the document feeding means is transported; and image reading means for reading an image from the document, the document stacking means including document lifting and lowering means for lifting or lowering the document stacked on the document stacking means over an entire range of a height of the curved transporting path, so as to feed the document to the document feeding means.

2. The image reading device as set forth in claim 1, wherein:

the document lifting and lowering means of the document stacking means lifts or lowers the document, so that the document is fed to the document feeding means in a direction parallel to a direction in which the document is picked up by the document feeding means.

3. The image reading device as set forth in claim 1, wherein:

the curved transporting path is curved towards a center of a main body of the image reading device and away from an end of the main body at which the image reading device is provided, within an installation width of the main body of the image reading device.

4. The image reading device as set forth in claim 1, further comprising:

ejection means for ejecting the document that has been read by the image reading means; and ejected document stacking means for stacking the document ejected by the ejecting means, wherein the ejection means is so positioned that a document ejection position of the ejection means and a document reading position of the image reading means are on the same level, and wherein the ejected document stacking means is so positioned that a document stacking position of the ejected document stacking means is lower than the document ejection position of the ejection means.

5. An image forming apparatus comprising an image reading device, the image reading device including:

document stacking means for stacking a document;

document feeding means for picking up, one sheet at a time, the document stacked on the document stacking means;

6. The image forming apparatus as set forth in claim 5, wherein:

the curved transporting path is curved towards a center of a main body of the image forming apparatus and away from an end of the main body at which the image forming apparatus is provided, within an installation width of the main body of the image forming apparatus.

* * * * *